(12) United States Patent
Inoue et al.

(10) Patent No.: US 8,773,350 B2
(45) Date of Patent: Jul. 8, 2014

(54) SENSOR CIRCUIT AND ELECTRONIC APPARATUS

(75) Inventors: Takahiro Inoue, Osaka (JP); Tadamasa Kimura, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 215 days.

(21) Appl. No.: 13/547,308

(22) Filed: Jul. 12, 2012

(65) Prior Publication Data
US 2013/0050068 A1    Feb. 28, 2013

(30) Foreign Application Priority Data

Aug. 31, 2011    (JP) ................................. 2011-189650

(51) Int. Cl.
*G09G 3/36*    (2006.01)

(52) U.S. Cl.
USPC .......................................... 345/102; 345/690

(58) Field of Classification Search
USPC .................... 345/102, 690, 84, 175
See application file for complete search history.

(56) References Cited

U.S. PATENT DOCUMENTS

| | | | | |
|---|---|---|---|---|
| 6,147,761 A | * | 11/2000 | Walowit et al. | 356/425 |
| 2004/0156473 A1 | * | 8/2004 | Nonaka et al. | 378/62 |
| 2010/0289835 A1 | * | 11/2010 | Holub | 345/690 |
| 2010/0311489 A1 | * | 12/2010 | Miller et al. | 463/16 |
| 2011/0007048 A1 | * | 1/2011 | Fratti et al. | 345/207 |
| 2011/0043471 A1 | * | 2/2011 | Senda et al. | 345/173 |
| 2011/0057930 A1 | * | 3/2011 | Keller et al. | 345/419 |
| 2012/0019493 A1 | * | 1/2012 | Barnhoefer et al. | 345/207 |

FOREIGN PATENT DOCUMENTS

| | | |
|---|---|---|
| JP | 2007-73591 A | 3/2007 |
| JP | 2009-182189 A | 8/2009 |

* cited by examiner

*Primary Examiner* — Ricardo L Osorio
(74) *Attorney, Agent, or Firm* — Birch, Stewart, Kolasch & Birch, LLP

(57) ABSTRACT

A sensor circuit which is capable of measuring illuminance without causing unevenness in results detected with spectral characteristics and a variation in sensitivity regardless of whether or not light receiving elements are evenly irradiated with light includes a plurality of light receiving elements, the light receiving elements each being set to a single spectral characteristic selected from spectral characteristics that are different from each other, and the single spectral characteristic set in each of the light receiving elements being sequentially switched among the spectral characteristics that are different from each other so that the light receiving elements are set to different spectral characteristics during measurement of the illuminance.

11 Claims, 17 Drawing Sheets

SENSOR CIRCUIT AND ELECTRONIC APPARATUS

This Nonprovisional application claims priority under 35 U.S.C. §119 on Patent Application No. 2011-189650 filed in Japan on Aug. 31, 2011, the entire contents of which are hereby incorporated by reference.

TECHNICAL FIELD

The present invention relates to a sensor circuit and an electronic apparatus each of which measures illuminance.

BACKGROUND ART

In recent years, an illuminance sensor for detecting surrounding brightness is provided in a liquid crystal panel of an electronic apparatus such as a mobile phone or a digital camera in order to control a light emission amount of a backlight of the liquid crystal panel in accordance with illuminance of disturbance (light such as solar light or fluorescent light). The light emission control of the backlight is carried out in accordance with brightness perceived by a user of the electronic apparatus, i.e., a human. As such, it is important that a spectral characteristic (spectral sensitivity characteristic) of the illuminance sensor be close to visual sensitivity (visual sensitivity characteristic).

Generally, a spectral characteristic close to visual sensitivity is achieved in an illuminance sensor by a method of performing subtraction with respect to electric currents of a plurality of photodiodes having different spectral characteristics (see, for example, Patent Literatures 1, 2, etc.).

Patent Literature 1 discloses an optical sensor circuit in which a spectral characteristic close to visual sensitivity is achieved by performing subtraction with respect to electric currents flowing through respective two photodiodes having different spectral characteristics with the use of a current mirror circuit. FIG. 20 is a circuit diagram illustrating an outline configuration of the optical sensor circuit 900 disclosed in Patent Literature 1. As illustrated in FIG. 20, the optical sensor circuit 900 includes a photodiode PD901, a photodiode PD902, and transistors Tr901 and Tr902 constituting a current mirror circuit. The optical sensor circuit 900 has an output terminal OUT that is connected to a drain terminal of the transistor Tr902 and to a cathode terminal of the photodiode PD902. The photodiode PD901 has a spectral characteristic having sensitivity in a wavelength range of infrared rays (hereinafter abbreviated as "spectral characteristic of infrared rays"), and the photodiode PD902 has a spectral characteristic having sensitivity in a wavelength range from infrared rays to visible light (hereinafter abbreviated as "spectral characteristic from visible light to infrared rays". Note that an electric current flowing when the photodiode PD901 receives light is referred to as an input electric current Iin901, and an electric current flowing when the photodiode PD902 receives light is referred to as an input electric current Iin902.

When the photodiodes PD901 and PD902 receive light, the input electric current Iin901 flows through the photodiode PD901, and this input electric current Iin901 flows also through the transistor Tr901. Since the transistor Tr901 constitutes the current mirror circuit together with the transistor Tr902, an electric current of (Iin901×α) flows through the transistor Tr902 (α: current mirror ratio).

Meanwhile, when the photodiodes PD901 and PD902 receive light, the input electric current Iin902 flows through the photodiode PD902. Accordingly, an electric current of (Iin902−Iin901×α) which is obtained by subtracting the electric current flowing through the transistor Tr902 from the input electric current Iin902 flows through the output terminal OUT. This electric current amount (Iin902−Iin901×α) allows a spectral characteristic close to visual sensitivity to be achieved since sensitivity to wavelengths of infrared rays is reduced.

As described above, the sensor circuit 900 is capable of achieving a spectral characteristic close to visual sensitivity by performing subtraction with respect to the electric currents (the input electric currents Iin901 and Iin902) respectively flowing through the two photodiodes PD901 and PD902 having different spectral characteristics with the use of the current mirror circuit. Further, the photodiode PD901 is disposed so as to be sandwiched by the photodiode PD902. This reduces unevenness of an output that occurs due to an angle of light.

Patent Literature 2 discloses an illuminance sensor for achieving a spectral characteristic close to visual sensitivity by directly performing subtraction with respect to electric currents flowing through two respective photodiodes having different spectral characteristics. FIG. 21 is a plan view illustrating an outline configuration of a light receiving element 910 provided in the illuminance sensor disclosed in Patent Literature 2. As illustrated in FIG. 21, the light receiving element 910 includes a first light receiving section having a spectral characteristic in a range approximately from visible light to infrared rays and a second light receiving section having a spectral characteristic of approximately infrared rays. The first light receiving section is divided into two sections (first light receiving sections PDA) having almost the same area, and the first light receiving sections PDA thus divided are connected in parallel. The second light receiving section is divided into two sections (second light receiving sections PDB) having almost the same area, and the second light receiving sections PDB thus divided are connected in parallel. Accordingly, a spectral characteristic close to visual sensitivity can be achieved by subtracting an electric current flowing through the second light receiving section from an electric current flowing through the first light receiving section.

Further, a lens section (not illustrated) for focusing light onto the first light receiving sections PDA and the second light receiving sections PDB is provided above the light receiving element 910. The lens section focuses light onto a lens spot 911 of FIG. 21. The first light receiving sections PDA and the second light receiving sections PDB are alternately disposed within the lens spot 911. By thus distributing the first light receiving sections PDA and the second light receiving sections PDB uniformly in plan view within the lens spot 911, unevenness of an output which occurs due o an angle of light is reduced.

In recent years, an illuminance sensor is required to have high resolution. Accordingly, a digital-type illuminance sensor is becoming mainstream in replacement of a conventional analog-type illuminance sensor. A digital-type illuminance sensor generally includes an analog/digital converting circuit for converting an output into a digital value.

FIG. 22 is a circuit diagram illustrating an outline configuration a digital-type illuminance sensor 920. As illustrated in FIG. 22, the illuminance sensor 920 includes a photodiode PD921 having a spectral characteristic of infrared rays, a photodiode PD922 having a spectral characteristic from visible light to infrared rays, analog-digital converting circuits (hereinafter abbreviated as "AD converting circuits") ADC921 and ADC922, a multiplying section 923, and a subtracting section 924. Note that an electric current flowing when the photodiode PD921 receives light is referred to as an input electric current Iin921, and an electric current flowing when the photodiode PD922 receives light is referred to as an input electric current Iin922.

When the photodiodes PD921 and PD922 receive light, the input electric current Iin921 flows through the photodiode PD921 and this input electric current Iin921 is supplied to the AD converting circuit ADC921, and the input electric current Iin922 flows through the photodiode PD922 and this input electric current Iin922 is supplied to the AD converting circuit ADC922.

The AD converting circuit ADC921 converts the input electric current Iin921 into a digital value, and outputs the digital value as a measurement signal ADCOUT921. The measurement signal ADCOUT921 is multiplied by $\alpha$ ($\alpha$: constant value) by the multiplying section 923, and is then supplied to the subtracting section 924. The AD converting circuit ADC922 converts the input electric current Iin922 into a digital value, and outputs the digital value as a measurement signal ADCOUT922. The measurement signal ADCOUT922 is supplied to the subtracting section 924.

The subtracting section 924 subtracts the measurement signal ADCOUT921 multiplied by $\alpha$ from the measurement signal ADCOUT922. The subtracting section 924 thus outputs a measurement signal of (ADCOUT922−ADCOUT921×$\alpha$). This measurement signal (ADCOUT922−ADCOUT921×$\alpha$) allows a spectral characteristic close to visual sensitivity to be achieved. That is, the same result as that obtained by the optical sensor circuit 900 of FIG. 20 can be obtained by digital computation ("ADCOUT922−ADCOUT921×$\alpha$=Iin902−Iin901×$\alpha$").

As described above, the illuminance sensor 920 can achieve a spectral characteristic close to visual sensitivity by converting the electric currents (the input electric currents Iin921 and Iin922) respectively flowing through the two photodiodes PD921 and PD922 having different spectral characteristics into digital values (the measurement signals ADCOUT921 and ADCOUT922) and then performing subtraction. Further, in a case where a light detection result (measured illuminance value) is outputted as a digital signal as in the illuminance sensor 920, processing using software in a CPU or a microcomputer becomes easy in a later step using the digital signal.

The AD converting circuits ADC921 and ADC922 are not limited to a specific configuration, but generally have an integral configuration. This is because an integral AD converting circuit allows highly accurate resolution with a simple configuration, and is therefore suitable for a device, such as an illuminance sensor, for which slow but high resolution (approximately 16 bit) is required.

CITATION LIST

Patent Literature 1

Japanese Patent Application Publication, Tokukai, No. 2007-73591 A (Publication Date: Mar. 22, 2007)

Patent Literature 2

Japanese Patent Application Publication, Tokukai, No. 2009-182189 A (Publication Date: Aug. 13, 2009)

SUMMARY OF INVENTION

Technical Problem

However, the above conventional illuminance sensors still cause a state in which the photodiodes (the light receiving sections) are unevenly irradiated with light. This is because, according to the configuration of the above conventional illuminance sensors, the positions of the photodiodes are fixed, and necessarily light is unevenly applied to the photodiodes depending on an angle of the light.

Further, according to the configuration in which a lens section for focusing light is provided above the light receiving element 910 as in the illuminance sensor of FIG. 21, the lens spot 911 may be deviated from the first light receiving sections PDA and the second light receiving sections PDB due to deviation of a mounting position and deviation of an incident angle. This would cause the first light receiving sections PDA and the second light receiving sections PDB to be unevenly irradiated with light (see FIG. 23).

As a result, there occurs a problem that outputs of the respective photodiodes (the respective light receiving sections) become uneven, and therefore a value obtained by performing subtraction with respect to these outputs, i.e., illuminance of visible light cannot be properly measured. Specifically, the following problem arises. There occurs unevenness between a result detected with the spectral characteristic of infrared rays and a result detected with the spectral characteristic from visible light to infrared rays, and there occurs a variation in sensitivity to a wavelength. Consequently, illuminance of visible light, which is obtained based on these results, cannot be accurately obtained.

The present invention was attained in view of the above conventional problems, and an object of the present invention is to provide a sensor circuit and an electronic apparatus each of which is capable of measuring illuminance without causing unevenness in results detected with respective spectral characteristics and variation in sensitivity regardless of whether or not light receiving elements are evenly irradiated with light.

Solution to Problem

In order to attain the above object, a sensor circuit of the present invention for measuring illuminance on a basis of a plurality of light amounts detected with spectral characteristics that are different from each other, includes n (n is an integer of 2 or more) light receiving elements; the light receiving elements each being set to a single spectral characteristic selected from n spectral characteristics that are different from each other, and the single spectral characteristic set in each of the light receiving elements being sequentially switched among the n spectral characteristics so that the light receiving elements are set to different spectral characteristics during measurement of the illuminance.

According to the arrangement, each of the light receiving elements can receive light with the use of a plurality of spectral characteristics. Accordingly, by sequentially switching a spectral characteristic of each of the light receiving elements among the plurality of spectral characteristics so that the light receiving elements are set to different spectral characteristics during measurement, it is possible to obtain, from each of the light receiving elements, a light amount detected with a single spectral characteristic. That is, this is equivalent to a case where detection is carried out while interchanging a position of a light receiving element having one spectral characteristic and a position of a light receiving element having another spectral characteristic.

Accordingly, it is possible to obtain results (light amounts) detected with the respective spectral characteristics that are necessary for measurement of illuminance without causing unevenness in the results and a variation in sensitivity even in a case where the light receiving elements are unevenly irradiated with light. Consequently, it is possible to measure illuminance without causing unevenness in results detected with spectral characteristics and a variation in sensitivity regardless of whether or not light receiving elements are evenly irradiated with light.

An electronic apparatus of the present invention includes: a liquid crystal panel; a backlight for illuminating the liquid crystal panel; a backlight control section for controlling luminance of the backlight; and a sensor circuit, the backlight control section controlling the luminance of the backlight in accordance with an output signal of the sensor circuit, the sensor circuit measuring illuminance on a basis of a plurality of light amounts detected with spectral characteristics that are different from each other, the sensor circuit including n (n is an integer of 2 or more) light receiving elements; the light receiving elements each being set to a single spectral characteristic selected from n spectral characteristics that are different from each other, and the single spectral characteristic set in each of the light receiving elements being sequentially switched among the n spectral characteristics so that the light receiving elements are set to different spectral characteristics during measurement of the illuminance.

Advantageous Effects of Invention

As described above, a sensor circuit of the present invention includes n (n is an integer of 2 or more) light receiving elements; the light receiving elements each being set to a single spectral characteristic selected from n spectral characteristics that are different from each other, and the single spectral characteristic set in each of the light receiving elements being sequentially switched among the n spectral characteristics so that the light receiving elements are set to different spectral characteristics during measurement of the illuminance. detected with the respective spectral characteristics that are necessary for measurement of illuminance without causing unevenness in the results and a variation in sensitivity even in a case where the light receiving elements are unevenly irradiated with light.

This produces an effect that it is possible to measure illuminance without causing unevenness in results detected with spectral characteristics and a variation in sensitivity regardless of whether or not light receiving elements are evenly irradiated with light.

DESCRIPTION OF EMBODIMENTS

Embodiment 1

An embodiment of the present invention is described below with reference to the drawings.

(Configuration of Sensor Circuit)

Figure 1:
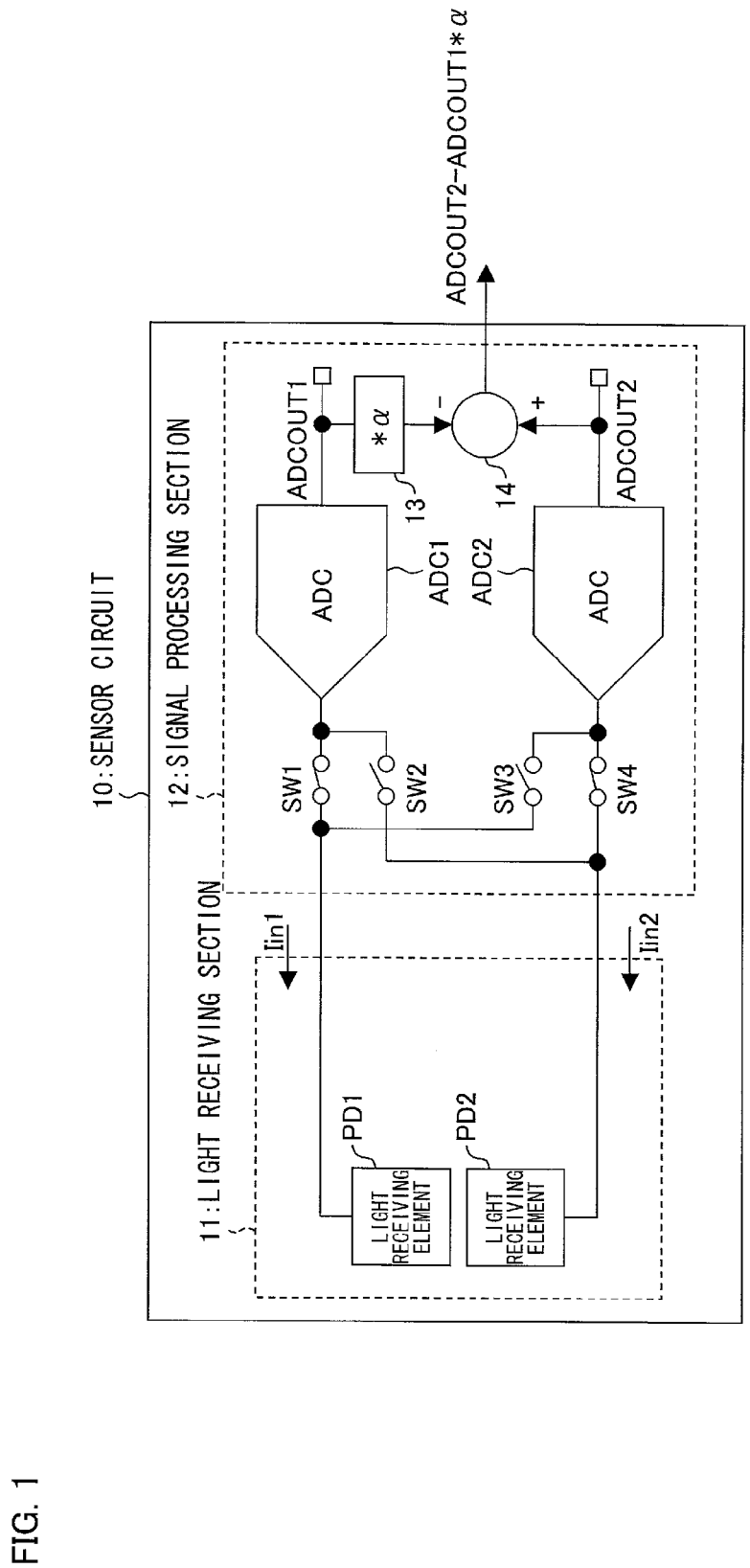
FIG. 1 is a circuit block diagram illustrating an exemplary configuration of a sensor circuit of an embodiment of the present invention.

FIG. 1 is a circuit block diagram illustrating an exemplary configuration of a sensor circuit 10 of the present embodiment. The sensor circuit 10 is a sensor for measuring illuminance of visible light on the basis of an amount of light applied during a measuring time. As illustrated in FIG. 1, the sensor circuit 10 includes a light receiving section 11 and a signal processing section 12.

The light receiving section 11 passes an electric current in accordance with light (brightness of light) applied to the light receiving section 11 (so-called photoelectric conversion). The light receiving section 11 includes a light receiving element PD1 and a light receiving element PD2 (a first light receiving element and a second light receiving element). An electric current (photoelectric current) which flows when the light receiving element PD1 receives light is referred to as an electric current Iin1, and an electric current which flows when the light receiving element PD2 receives light is referred to as an electric current Iin2. The light receiving element PD1 and the light receiving element PD2 are different only in spectral characteristic during operation of the sensor circuit 10, and have an identical structure. The following describes the structure of the light receiving elements PD1 and PD2 with reference to a light receiving element PD of FIG. 2.

Figure 2:
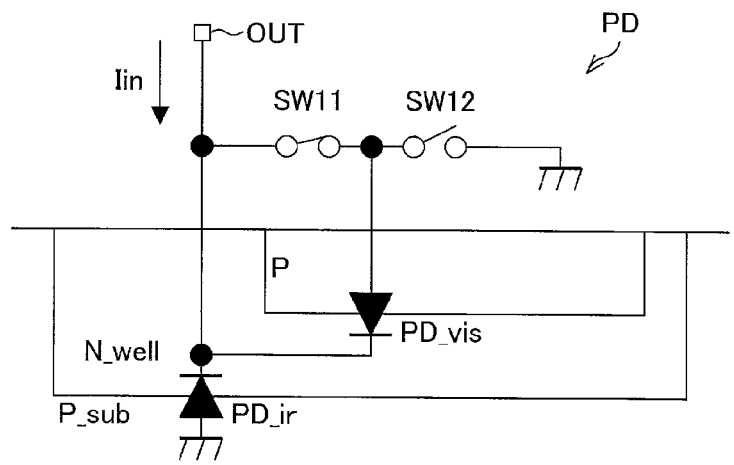
FIG. 2 is a diagram illustrating an example of a structure and an electrical arrangement of a light receiving element.

FIG. 2 is a diagram illustrating a structure and an electrical arrangement of the light receiving element PD. The light receiving element PD includes a semiconductor substrate, a switch SW11, and a switch SW12. The semiconductor substrate is arranged such that an N-type well layer (N-type semiconductor region N_well) is formed in a P-type substrate (P-type semiconductor substrate P_sub) and a P-type diffusion layer (P-type semiconductor region P) is formed in the N-type well layer. The P-type substrate is connected to the ground. The N-type well layer is connected to an output terminal OUT having an electric potential higher than the ground.

In the semiconductor substrate, a photodiode PDir is formed by the P-type substrate and the N-type well layer (PN junction). Further, a photodiode PDvis is formed by the N-type well layer and the P-type diffusion layer (PN junction). The photodiode PDir and the photodiode PDvis are formed in the identical semiconductor substrate, but are different from each other in peak sensitivity wavelength due to a difference in depth of the junctions. Specifically, the photodiode PDir is formed in a deep place, and has a peak sensitivity wavelength which falls in a wavelength range of infrared rays. Meanwhile, the photodiode PDvis is formed in a shallow place, and has a peak sensitivity wavelength which falls in a wavelength range of visible light.

One terminal of the switch SW11 is connected to the output terminal OUT, and the other terminal of the switch SW11 is connected to the P-type diffusion layer. The switch SW11 turns on/off in accordance with a switching signal, thereby allowing/breaking electrical connection between the output terminal OUT and the P-type diffusion layer. One terminal of the switch SW12 is connected to the other terminal of the switch SW11 and to the P-type diffusion layer, and the other terminal of the switch SW12 is connected to the ground. The switch SW12 turns on/off in accordance with a switching signal, thereby allowing/breaking electrical connection between (i) the other terminal of the switch SW11 and the P-type diffusion layer and (ii) the ground. The switching signals are supplied from an external control section or the like.

Accordingly, in a case where the switch SW11 is on and the switch SW12 is off, the photodiode PDir becomes conductive and the photodiode PDvis is short-circuited. As a result, only the photodiode PDir is used in the light receiving element PD. Therefore, when the light receiving element PD receives light in this connection arrangement, a photoelectric current flowing through the photodiode PDir is outputted as an electric current Iin of the light receiving element PD. Accordingly, the light receiving element PD in this connection arrangement is set to a spectral characteristic (first spectral characteristic) (hereinafter referred to as a spectral characteristic B) having sensitivity in a wavelength range of infrared rays.

Meanwhile, in a case where the switch SW11 is off and the switch SW12 is on, the photodiode PDir and the photodiode PDvis become conductive. As a result, both of the photodiode PDir and the photodiode PDvis are used in the light receiving element PD. Therefore, when the light receiving element PD receives light in this connection arrangement, an electric current which is the sum of a photoelectric current flowing through the photodiode PDir and a photoelectric current flowing through the photodiode PDvis is outputted as the electric current Iin of the light receiving element PD. Accordingly, the light receiving element PD in this connection arrangement is set to a spectral characteristic (second spectral characteristic) (hereinafter referred to as a spectral characteristic A) having sensitivity in a wavelength range from visible light to infrared rays.

Figure 3:
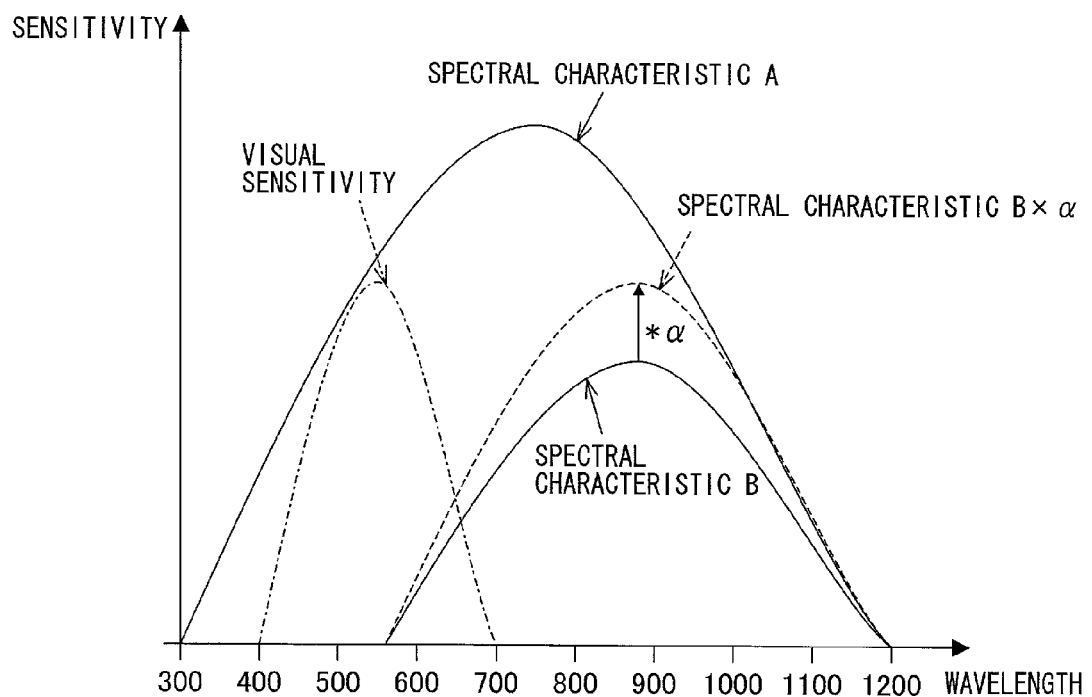
FIG. 3 is a graph illustrating spectral characteristics of the light receiving element.

FIG. 3 is a graph illustrating spectral characteristics of the light receiving element PD. In FIG. 3, the horizontal axis represents a wavelength (nm) and the vertical axis represents sensitivity. In the graph, the solid lines represent the spectral characteristic A and the spectral characteristic B, the broken line represents the spectral characteristic B multiplied by $\alpha$, and the dashed-dotted line represents visual sensitivity.

The spectral characteristic A having sensitivity in a wavelength range from visible light to infrared rays has a peak sensitivity wavelength in the vicinity of 750 nm and gradually attenuates in a range from approximately 300 nm to approximately 1200 nm.

The spectral characteristic B having sensitivity in a wavelength range of infrared rays has a peak sensitivity wavelength in the vicinity of 900 nm and gradually attenuate in a range from approximately 550 nm to approximately 1200 nm.

The visual sensitivity has a peak sensitivity wavelength in the vicinity of 550 nm and gradually attenuates in a range from approximately 400 nm to approximately 700 nm. Note that the sensitivity of the spectral characteristic B at its peak sensitivity wavelength is lower than the sensitivity of the visual sensitivity at its peak sensitivity wavelength. The constant value $\alpha$ is a constant value for allowing the spectral characteristic B to approach the visual sensitivity. The spectral characteristic B×$\alpha$ is a value obtained by multiplying the intensity of the spectral characteristic B by $\alpha$.

As described above, the light receiving element PD includes two PN junctions, and therefore includes two photodiodes, i.e., the photodiode PDir and the photodiode PDvis. The light receiving element PD is set to any one of the spectral characteristic A and the spectral characteristic B by switching the connection arrangement with the use of the switches SW11 and SW12.

The signal processing section 12 calculates illuminance of visible light on the basis of an electric current flowing through the light receiving section 11. The signal processing section 12 carries out the calculation of the illuminance with the use of a digital value, and outputs a result of the calculation as a digital signal. The signal processing section 12 includes switches SW1 through SW4, analog/digital converting circuits (hereinafter abbreviated as "AD converting circuit") ADC1 and ADC2 (a first converting section and a second converting section), a multiplying section 13, and a subtracting section 14.

An input section of the AD converting circuit ADC1 is electrically connected to the light receiving element PD1 via the switch SW1 and to the light receiving element PD2 via the switch SW2, and an output section of the AD converting circuit ADC1 is connected to the multiplying section 13. An input section of the AD converting circuit ADC2 is electrically connected to the light receiving element PD2 via the switch SW4 and to the light receiving element PD1 via the switch SW3, and an output section of the AD converting circuit ADC2 is connected to the subtracting section 14.

The switch SW1 turns on/off in accordance with a switching signal, thereby allowing/breaking electrical connection between the AD converting circuit ADC1 and the light receiving element PD1. The switch SW2 turns on/off in accordance with a switching signal, thereby allowing/breaking electrical connection between the AD converting circuit ADC1 and the light receiving element PD2. The switch SW3 turns on/off in accordance with a switching signal, thereby allowing/breaking electrical connection between the AD converting circuit ADC2 and the light receiving element PD1. The switch SW4 turns on/off in accordance with a switching signal, thereby allowing/breaking electrical connection between the AD converting circuit ADC2 and the light receiving element PD2. Each of these switching signals is supplied from an external control section or the like.

The multiplying section 13 supplies, to the subtracting section 14, a signal (ADCOUT1×α) which is obtained by multiplying an output signal (ADCOUT1) from the AD converting circuit ADC1 by α. The subtracting section 14 outputs a signal (ADCOUT2−ADCOUT1×α) which is obtained by subtracting the output signal (ADCOUT1×α) supplied from the multiplying section 13 from an output signal (ADCOUT2) supplied from the AD converting circuit ADC2. This output signal (ADCOUT2−ADCOUT1×α) becomes a signal which represents illuminance of visible light detected by the sensor circuit 10.

The AD converting circuits ADC1 and ADC2 have an identical configuration. The following describes the configuration of the AD converting circuits ADC1 and ADC2 with reference to an AD converting circuit ADC of FIG. 4.

Figure 4:
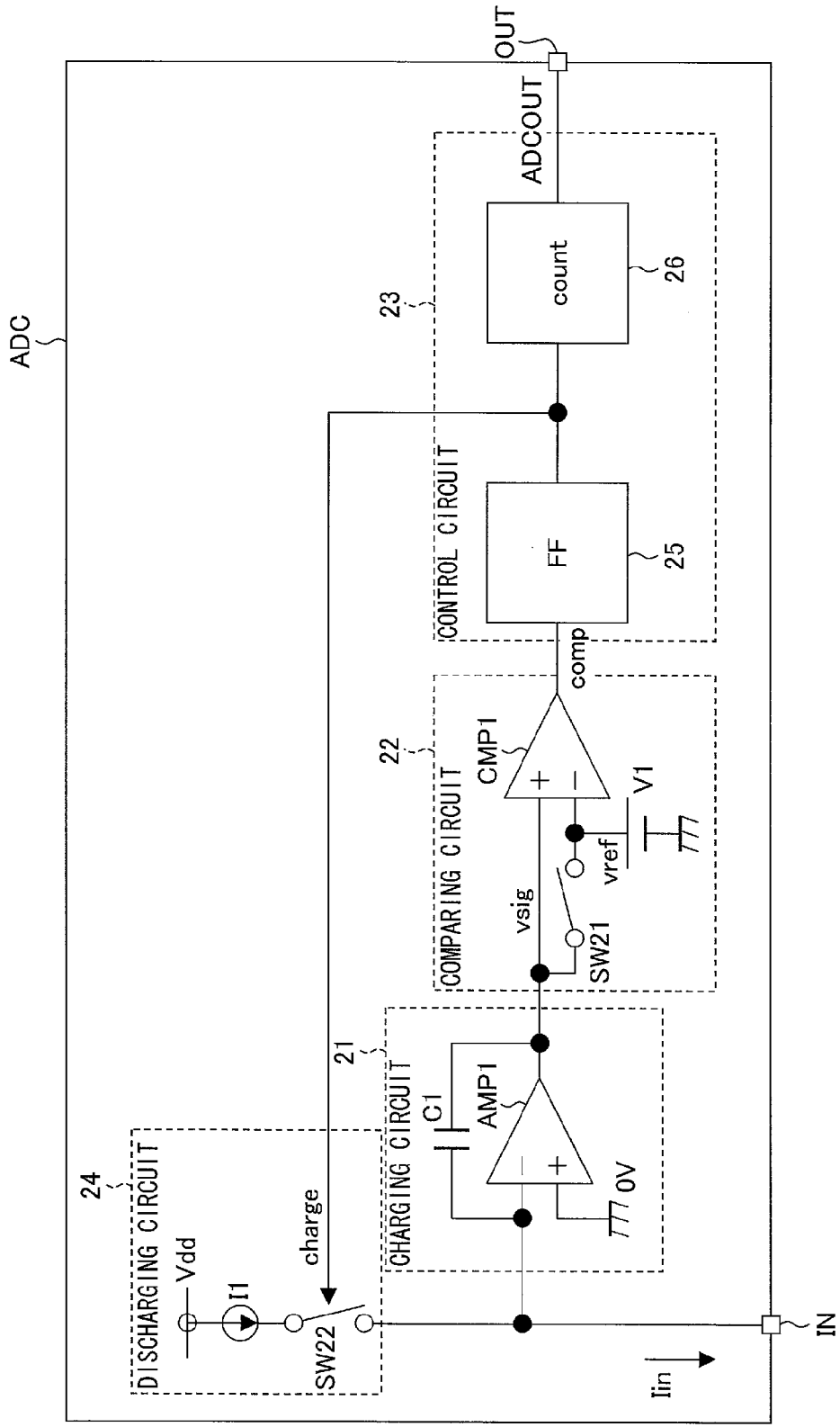
FIG. 4 is a diagram illustrating an exemplary configuration of an AD converting circuit.

FIG. 4 is a diagram illustrating a configuration of the AD converting circuit ADC. The AD converting circuit ADC is an integral AD converting circuit which converts an electric current amount of an input electric current Iin into a digital value and outputs the digital value. As illustrated in FIG. 4, the AD converting circuit ADC includes a charging circuit 21, a comparing circuit 22, a control circuit 23, and a discharging circuit 24. Further, the AD converting circuit ADC has an input terminal IN and an output terminal OUT. The AD converting circuit ADC may be an integrated circuit.

The charging circuit 21 is a circuit that is charged by the input electric current Tin. The charging circuit 21 includes an amplifying circuit AMP1 and a capacitor C1 which stores an electric charge corresponding to the input electric current Iin. The amplifying circuit AMP1 has (i) an inverting input terminal that is connected to the input terminal IN, (ii) a non-inverting input terminal that is connected to the ground (0V), and (iii) an output terminal that is connected to the comparing circuit 22. The capacitor C1 is provided between the inverting input terminal and the output terminal of the amplifying circuit AMP1. The amplifying circuit AMP1 and the capacitor C1 thus constitute an integral circuit.

The comparing circuit 22 includes a comparator CMP1, a switch SW21, and a reference voltage supply V1. The comparator CMP1 has (i) a non-inverting input terminal that is connected to the charging circuit 21, (ii) an inverting input terminal that is connected to the charging circuit 21 via the switch SW21 and to the reference voltage supply V1, and (iii) an output terminal that is connected to the control circuit 23. The switch SW21 turns on/off in accordance with a switching signal, thereby allowing/breaking electrical connection between the charging circuit 21 and the inverting input terminal of the comparator CMP1. The reference voltage supply V1 applies a reference voltage Vref to the inverting input terminal of the comparator CMP1.

The control circuit 23 counts the number of times the discharging circuit 24 discharges the charging circuit 21 during a measuring time, on the basis of a result of comparison of the comparing circuit 22, and outputs a digital value corresponding to the number of times. The control circuit 23 includes a flip-flop (FF) 25 and a counter (count) 26. The FF 25 has (i) an input section that is connected to the comparing circuit 22, and (ii) an output section that is connected to the counter 26 and to the discharging circuit 24. The counter 26 has an output section that is connected to the output terminal OUT.

The discharging circuit 24 discharges the charging circuit 21 (discharges the electric charge stored in the capacitor C1) when an output voltage of the charging circuit 21 exceeds the reference voltage Vref. The discharging circuit 24 includes an electric current source I1 and a switch SW22. One terminal of the switch SW22 is connected to the electric current source I1, and the other terminal of the switch SW22 is connected to the charging circuit 21 and to the input terminal IN. The switch SW22 turns on/off in accordance with a switching signal (an output signal charge of the FF25), thereby allowing/breaking electrical connection between (i) the electric current source I1 and (ii) the charging circuit 21 and the input terminal IN.

(Operation of Sensor Circuit)

Next, an operation of the sensor circuit 10 is described.

Figure 5:
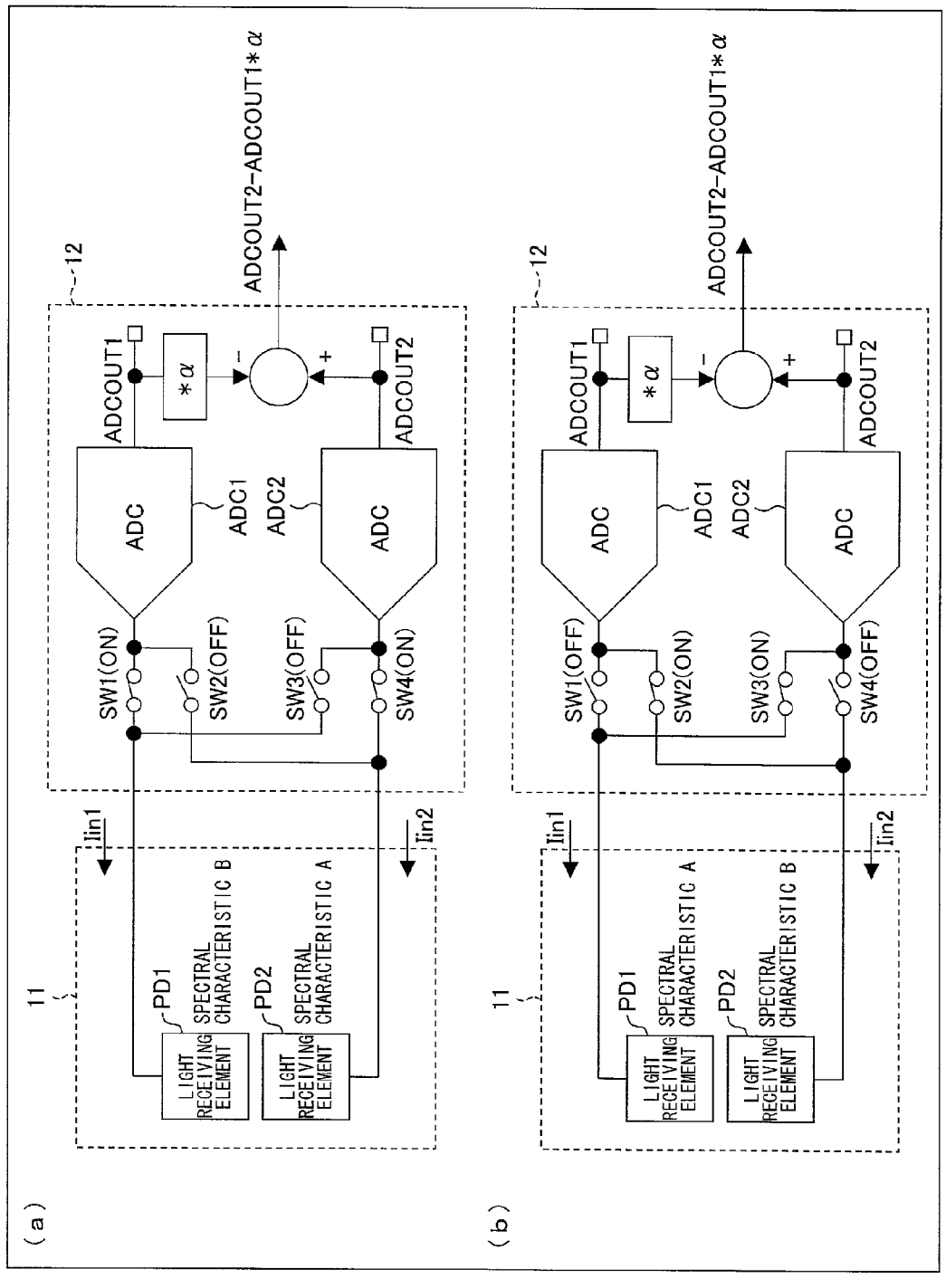
FIG. 5 is a diagram illustrating internal switching in the sensor circuit during operation of the sensor circuit, (a) of FIG. 5 illustrates wirings during a first measuring time and (b) of FIG. 5 illustrates wirings during a second measuring time.
Figure 6:
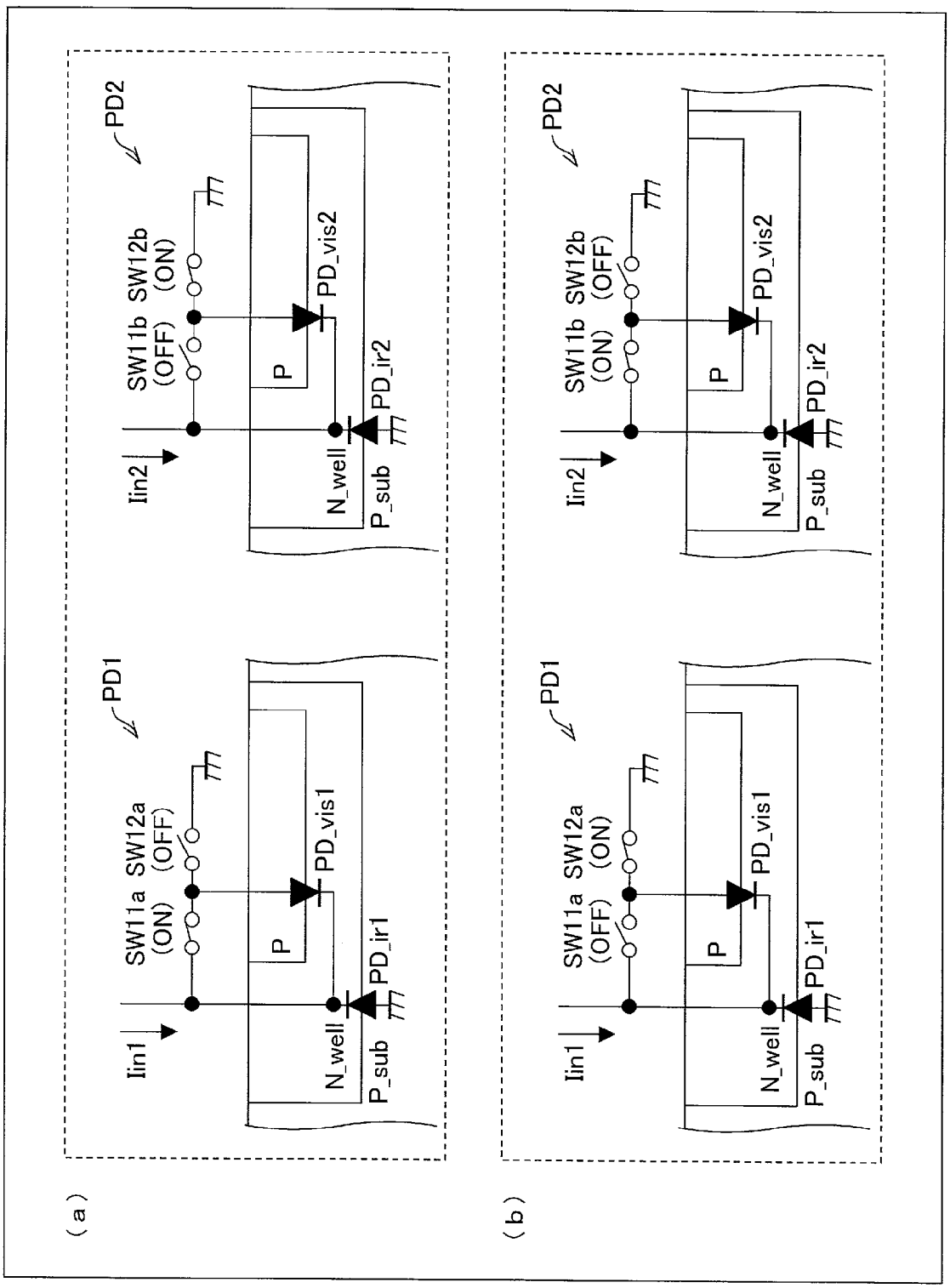
FIG. 6 is a diagram illustrating internal switching in the in the light receiving elements during operation of the sensor circuit, (a) of FIG. 6 illustrates wirings during a first measuring time and (b) of FIG. 6 illustrates wirings during a second measuring time.

FIG. 5 is a diagram illustrating internal switching in the sensor circuit 10 during operation of the sensor circuit 10. (a) of FIG. 5 illustrates wirings during a first measuring time and (b) of FIG. 5 illustrates wirings during a second measuring time. FIG. 6 is a diagram illustrating internal switching in the light receiving elements PD1 and PD2 during operation of the sensor circuit 10. (a) of FIG. 6 illustrates wirings during the first measuring time and (b) of FIG. 6 illustrates wirings during the second measuring time.

The sensor circuit 10 measures illuminance through operations in the two successive measuring times (periods). In the present embodiment, out of the two measuring times for measuring illuminance, a first one is referred to as the first measuring time (first measuring period), and a next one is referred to as the second measuring time (second measuring period).

First, the sensor circuit 10 operates as follows during the first measuring time.

As illustrated in (a) of FIG. 5, the switches SW1 and SW4 are turned on and the switches SW2 and SW3 are turned off. This causes the light receiving element PD1 to be connected to the AD converting circuit ADC1 and causes the light receiving element PD2 to be connected to the AD converting circuit ADC2.

As illustrated in (a) of FIG. 6, in the light receiving element PD1, the switch SW11$a$ is turned on and the switch SW12$a$ is turned off. In the light receiving element PD2, the switch SW11$b$ is turned off and the switch SW12$b$ is turned on. As a result, the light receiving element PD1 is set to the spectral characteristic B (infrared rays), and the light receiving element PD2 is set to the spectral characteristic A (visible light to infrared rays).

Accordingly, when the light receiving elements PD1 and PD2 receive light during the first measuring time, the electric current Iin1 that has passed through the light receiving element PD1 is supplied to the AD converting circuit ADC1, and the electric current Iin2 that has passed through the light receiving element PD2 is supplied to the AD converting circuit ADC2.

Subsequently, the sensor circuit 10 operates as follows during the second measuring time.

As illustrated in (b) of FIG. 5, the switches SW1 and SW4 are turned off and the switches SW2 and SW3 are turned on. This causes the light receiving element PD1 to be connected to the AD converting circuit ADC2 and causes the light receiving element PD2 to be connected to the AD converting circuit ADC1.

As illustrated in (b) of FIG. 6, in the light receiving element PD1, the switch SW11$a$ is turned off and the switch SW12$a$ is turned on. In the light receiving element PD2, the switch SW11b is turned on and the switch SW12b is turned off. As a result, the light receiving element PD1 is set to the spectral characteristic A (visible light to infrared rays), and the light receiving element PD2 is set to the spectral characteristic B (infrared rays).

Accordingly, when the light receiving elements PD1 and PD2 receive light during the second measuring time, the electric current Iin1 that has passed through the light receiving element PD1 is supplied to the AD converting circuit ADC2, and the electric current Iin2 that has passed through the light receiving element PD2 is supplied to the AD converting circuit ADC1.

Throughout the first measuring time and the second measuring time, a photoelectric current detected with the spectral characteristic B is supplied to the AD converting circuit ADC1, and a photoelectric current detected with the spectral characteristic A is supplied to the AD converting circuit ADC2. During these periods, the AD converting circuits ADC1 and ADC2 carry out digital conversion of the photoelectric currents thus inputted.

Figure 7:
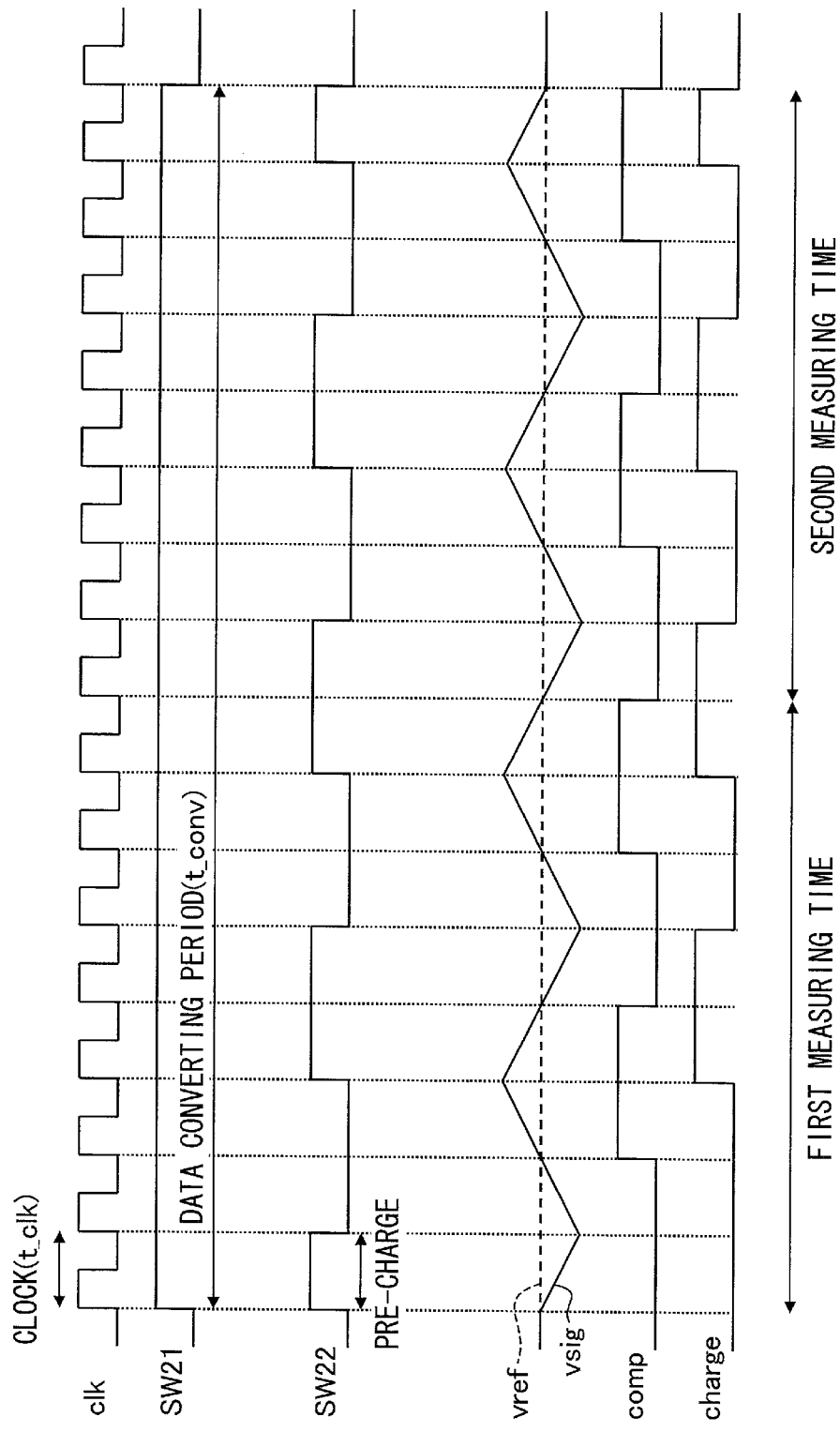
FIG. 7 is a diagram illustrating an example of operation waveforms of the AD converting circuit.

The following describes, as an example, how the AD converting circuit ADC1 operates in a case where a certain amount of photoelectric current is inputted, with reference to FIG. 4 and FIG. 7. The AD converting circuit ADC2 operates in a similar manner to the AD converting circuit ADC1 although explanation of the operation of the AD converting circuit ADC2 is omitted.

FIG. 7 illustrates an example of operation waveforms of the AD converting circuit ADC1. In FIG. 7, clk represents a clock signal, SW21 represents an ON/OFF state of the switch SW21, SW22 represents an ON/OFF state of the switch SW22, vref represents a voltage of the reference voltage supply V1, vsig represents an output of the charging circuit 21, comp represents an output of the comparing circuit 22, and charge represents an output of the control circuit 23 for turning ON/OFF the switch SW22.

Before start of a converting operation, the switch SW21 is off. Accordingly, the output vsig of the charging circuit 21 (integral circuit) is charged to the voltage vref of the reference voltage supply V1.

It is not until the switch SW21 turns on that the AD converting circuit ADC1 becomes capable of charging the capacitor C1 with the electric current Iin. Thus, the converting operation is carried out. An ON period of the switch SW21 is a data converting period (t_conv) and corresponds to the first measuring time and the second measuring time.

First, when the switch SW21 is turned off, the switch SW22 is turned on. This causes the discharging circuit 24 to discharge a certain amount of electric charge (I1×t_clk) from the capacitor C1 (pre-charge operation). Subsequently, the switch SW22 is turned off. This causes the charging circuit 21 to be charged with the electric current Iin1 supplied from the light receiving element PD1. As a result, the output vsig of the charging circuit 21 increases. When the output vsig exceeds the voltage vref, the output comp of the comparing circuit 22 changes from Low level to High level. Accordingly, the output of the FF 25, i.e., the output charge of the control circuit 23 changes from Low level to High level. This causes switch SW22 to turn on. The discharging circuit 24 thus causes the certain amount of electric charge (I1×t_clk) to be discharged.

Subsequently, the output vsig of the charging circuit 21 declines as a result of the discharge. When the output vsig goes below the voltage vref, the output comp of the comparing circuit 22 changes from High level to Low level. Accordingly, the output of the FF 25, i.e., the output charge of the control circuit 23 changes from High level to Low level. This causes the switch SW22 to turn off. As a result, the discharge stops.

Subsequently, the charging circuit 21 is charged again with the electric current Iin1 supplied from the light receiving element PD1, and a similar operation to that described above is carried out. In the second measuring time after the first measuring time, the charging circuit 21 is charged with the electric current Iin2 supplied from the light receiving element PD2.

Meanwhile, during the data converting period (t_conv), the counter 26 counts the number of times the output of the FF 25 becomes High level, i.e., the number of discharging times. A digital value of the number thus counted is outputted as a value corresponding to an input electric charge amount. The output of the counter 26 becomes an output ADCOUT1 of the AD converting circuit ADC1.

The AD converting circuit ADC1 operates so that an electric charge amount charged with the electric current Iin (Iin1 or Iin2) becomes equal to an electric charge amount discharged with (I1×t_clk). That is, the charged electric charge amount (Iin×t_conv)=the discharged electric charge amount (I1×t_clk×count). As such, the following equation is established:

$$count = (Iin \times t\_conv)/(I1 \times t\_clk)$$

count: value indicative of the number of counted discharging times
Iin: input electric current value
I1: reference electric current value
t_conv: charging time
t_clk: clock cycle This shows that minimum resolution of the value (count) indicative of the number of counted discharging times is determined by (I1×t_clk).

In a case where the charging period $t\_conv = t\_clk \times 2^n$ (n: resolution), the following is established:

$$count = (Iin/I1) \times 2^n$$

Accordingly, for example, in a case where the resolution n=16 bits, a count value (count) in a range from 0 to 65535 which corresponds to the input electric current Iin is outputted. This allows the AD converting circuit ADC1 to carry out analog/digital conversion of a wide dynamic range and high resolution. This is suitable for a device, such as an illuminance sensor, that requires low but high resolution (approximately 16 bits).

In this way, the measurement signal ADCOUT1 which is a digital value corresponding to a photoelectric current detected with the spectral characteristic B is outputted from the AD converting circuit ADC1 throughout the first measuring time and the second measuring time. Similarly, the measurement signal ADCOUT2 which is a digital value corresponding to a photoelectric current detected with the spectral characteristic A is outputted from the AD converting circuit ADC2 throughout the first measuring time and the second measuring time.

The measurement signal ADCOUT1 is multiplied by α (α: constant value) by the multiplying section 13, and is then supplied to the subtracting section 14. The measurement signal ADCOUT2 is directly supplied to the subtracting section 14. The subtracting section 14 subtracts the measurement signal ADCOUT1 multiplied by α from the measurement signal ADCOUT2. The subtracting section 14 thus outputs a measurement signal (ADCOUT2−ADCOUT1×α). In this measurement signal (ADCOUT2−ADCOUT1×α), a spectral characteristic close to visual sensitivity is achieved. As such the measurement signal (ADCOUT2−ADCOUT1×α) is a value indicative of illuminance of visible light.

As described above, the sensor circuit 10 can measure illuminance of visible light on the basis of light amounts detected by the light receiving elements PD1 and PD2 during the first measuring time and the second measuring time.

Further, the sensor circuit 10 can obtain a light amount detected with the spectral characteristic A from the light receiving element PD2 in the first measuring time and from the light receiving element PD1 in the second measuring time. Further, the sensor circuit 10 can obtain a light amount detected with the spectral characteristic B from the light receiving element PD1 in the first measuring time and from the light receiving element PD2 in the second measuring time. That is, this is equivalent to a case where detection is carried out while interchanging a position of the light receiving element having the spectral characteristic A and a position of the light receiving element having the spectral characteristic B between the first measuring time and the second measuring time.

Accordingly, even in a case where the light receiving elements PD1 and PD2 are unevenly irradiated with light, it is possible to obtain results (light amounts) detected with the spectral characteristics A and B which are necessary for measurement of illuminance without causing unevenness in the results and variation in sensitivity. Consequently, it is possible to measure illuminance without causing unevenness in results detected with the spectral characteristics A and B and variation in sensitivity regardless of whether or not the light receiving elements PD1 and PD2 are evenly irradiated with light.

In the sensor circuit 10, the analog/digital conversion is carried out with the use of the AD converting circuits ADC1 and ADC2 each having an integral configuration illustrated in FIG. 4. Accordingly, analog/digital conversion can be carried out with a wide dynamic range and high resolution of the AD converting circuits ADC1 and ADC2. Further, since each of the AD converting circuits ADC1 and ADC2 is an integral AD converting circuit, a process of converting a photoelectric current detected with a predetermined spectral characteristic into a digital value can be easily carried out on the basis of an inputted electric current even in a case where light receiving elements respectively connected to the AD converting circuits ADC1 and ADC2 vary between the first measuring time and the second measuring time.

Note, however, that each of the AD converting circuits ADC1 and ADC2 is not limited to this configuration, and may have a configuration of a general AD converting circuit although use of the integral configuration illustrated in FIG. 4 produces a large effect as described above.

Although the above description has dealt with an operation of measuring illuminance during the first measuring time and the second measuring time, the number of successive measuring times is not limited to 2, and can be a multiple of 2. For example, a similar effect can be obtained even in a case where illuminance is measured during four successive measuring times (a first measuring time, a second measuring time, a third measuring time, and a fourth measuring time). In this case, it is only necessary that spectral characteristics of the light receiving elements PD1 and PD2 in the first measuring time be identical to those in the third measuring time and that spectral characteristics of the light receiving elements PD1 and PD2 in the second measuring time be identical to those in the fourth measuring time.

Figure 8:
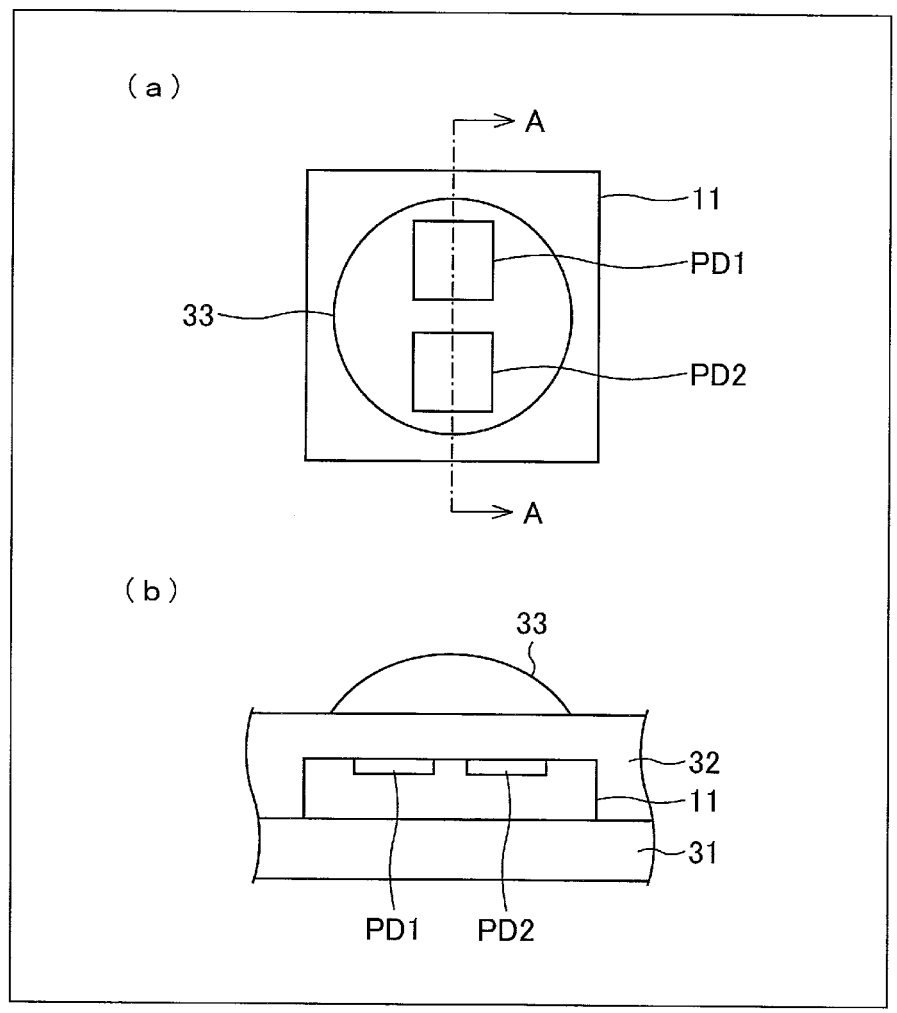
FIG. 8 is a diagram illustrating an exemplary configuration of a light receiving section, (a) of FIG. 8 is a plan view, and (b) of FIG. 8 is a cross-sectional view.

The sensor circuit 10 may further include a sealing resin for sealing the light receiving elements PD1 and PD2, as illustrated in FIG. 8. FIG. 8 is a diagram illustrating an exemplary configuration of the light receiving section 11. (a) of FIG. 8 is a plan view, and (b) of FIG. 8 is a cross-sectional view.

The light receiving section 11 has a chip-like shape and includes the light receiving elements PD1 and PD2 formed on a top surface thereof. The light receiving section 11 is provided on a substrate 31. On the substrate 31, a sealing resin 32 for sealing the light receiving section 11 is provided. On a surface of the sealing resin 32, a lens section 33 is provided. The lens section 33 is provided above the light receiving elements PD1 and PD2. The lens section 33 allows light to be suitably focused onto the light receiving elements PD1 and PD2.

(Modification of Illuminance Measurement)

The sensor circuit 10 has the configuration for measuring illuminance of visible light by performing subtraction with respect to the spectral characteristics A and B. This configuration can be modified as follows.

For example, the spectral characteristics A and B are not limited to those illustrated in FIG. 3. The peak sensitivity wavelengths and the wavelength ranges in which sensitivity exists may be changed, as long as a spectral characteristic close to visual sensitivity can be achieved. Further, a subtraction method using three or more spectral characteristics may be used, as long as a spectral characteristic close to visual sensitivity can be achieved. In this case, it is only necessary to configure a sensor circuit such that (i) the sensor circuit includes three or more light receiving elements, three or more AD converting circuits, and switches for allowing/breaking connection between the light receiving elements and the AD converting circuits and (ii) each of the light receiving elements includes three or more PN junctions and can be set to any one of three or more spectral characteristics.

That is, it is only necessary that the sensor circuit 10 include n (n is an integer of two or more) light receiving elements each of which is set to one of n different spectral characteristics.

Also in the above configuration, the measuring operation is similar to that of the sensor circuit 10. Since each of the light receiving elements can receive light with a plurality of spectral characteristics, a spectral characteristic set in each of the light receiving elements is sequentially switched among the plurality of spectral characteristics so that the light receiving elements are set to different spectral characteristics during measurement of the illuminance. This makes it possible to obtain a light amount detected with a single spectral characteristic from each of the light receiving elements.

Figure 9:
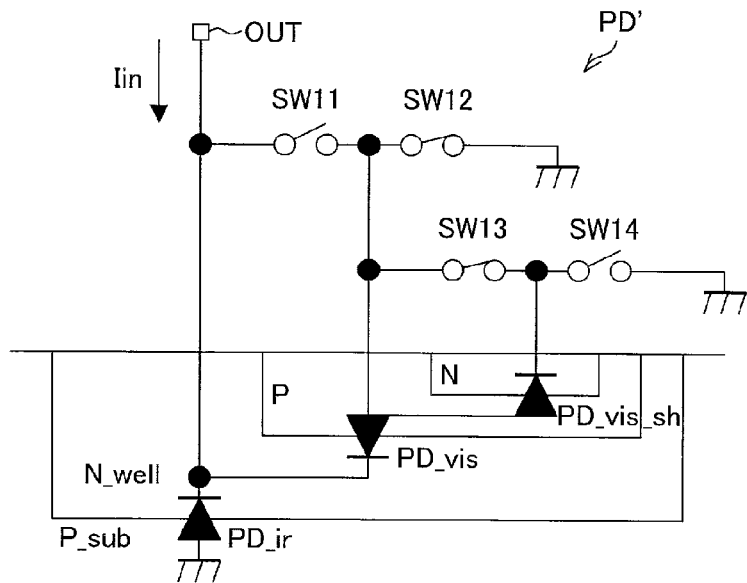
FIG. 9 is a diagram illustrating another example of a structure and an electrical arrangement of a light receiving element.

FIG. 9 illustrates, as an example, a structure of a light receiving element including three PN junctions.

FIG. 9 is a diagram illustrating a structure and an electrical arrangement of a light receiving element PD'. The light receiving element PD' includes a semiconductor substrate and switches SW11 through SW14. The semiconductor substrate is arranged such that (i) an N-type well layer (N-type semiconductor region N_well) is formed in a P-type substrate (P-type semiconductor substrate P_sub), (ii) a P-type diffusion layer (P-type semiconductor region P) is formed in the N-type well layer, and (iii) an N-type diffusion layer (N-type semiconductor region N) is formed in the P-type diffusion layer. The P-type substrate is connected to the ground. The N-type well layer is connected to an output terminal OUT having an electric potential higher than the ground.

In the semiconductor substrate, a photodiode PDir is formed by the P-type substrate and the N-type well layer (PN junction). Further, a photodiode PDvis is formed by the N-type well layer and the P-type diffusion layer (PN junction). Furthermore, a photodiode PDvissh is formed by the P-type diffusion layer and the N-type diffusion layer (PN junction). The photodiode PDir, the photodiode PDvis, and the photodiode PDvissh are formed in the identical semiconductor substrate, but are different from each other in peak sensitivity wavelength due to a difference in depth of junctions. Specifically, the photodiode PDir is formed in a deep place, and has a peak sensitivity wavelength which falls in a wavelength range of infrared rays. The photodiode PDvis is formed in a shallow place, and has a peak sensitivity wavelength which falls in a wavelength range of visible light. The photodiode PDvissh is formed in a place even shallower than the photodiode PDvis, and has a peak sensitivity wavelength which is located on a shorter wavelength side than the wavelength range of visible light.

One terminal of the switch SW is connected to the output terminal OUT, and the other terminal of the switch SW is connected to the P-type diffusion layer. One terminal of the switch SW12 is connected to the other terminal of the switch SW11 and to the P-type diffusion layer, and the other terminal of the switch SW12 is connected to the ground. One terminal of the switch SW13 is connected to the other terminal of the switch SW11 and to the P-type diffusion layer, and the other terminal of the switch SW13 is connected to the N-type diffusion layer. One terminal of the switch SW14 is connected to the other terminal of the switch SW13 and to the N-type diffusion layer, and the other terminal of the switch SW14 is connected to the ground. The switch SW11 turns on/off in accordance with a switching signal, thereby allowing/breaking electrical connection between the output terminal OUT and the P-type diffusion layer. The switch SW12 turns on/off in accordance with a switching signal, thereby allowing/breaking electrical connection between (i) the other terminal of the switch SW and the P-type diffusion layer and (ii) the ground. The switch SW13 turns on/off in accordance with a switching signal, thereby allowing/breaking electrical connection between (i) the other terminal of the switch SW11 and the P-type diffusion layer and (ii) the N-type diffusion layer. The switch SW14 turns on/off in accordance with a switching signal, thereby allowing/breaking electrical connection between (i) the other terminal of the switch SW13 and the N-type diffusion layer and (ii) the ground. Each of the switching signals is supplied from an external control section or the like.

Accordingly, in a case where the switch SW11 is on, the switch SW12 is off, the switch SW13 is on, and the switch SW14 is off, the photodiode PDir becomes conductive and the photodiodes PDvis and PDvissh are short-circuited. As a result, only the photodiode PDir is used in the light receiving element PD'. Therefore, when the light receiving element PD' receives light in this connection arrangement, a photoelectric current flowing through the photodiode PDir is outputted as an electric current Iin of the light receiving element PD'. Accordingly, the light receiving element PD' in this connection arrangement is set to a spectral characteristic having sensitivity in a wavelength range of infrared rays (the spectral characteristic B).

Meanwhile, in a case where the switch SW11 is off, the switch SW12 is on, the switch SW13 is off, and the switch SW14 is on, the photodiodes PDir and PDvis become conductive, and the photodiode PDvissh is short-circuited. As a result, the photodiodes PDir and PDvis are used in the light receiving element PD'. Therefore, when the light receiving element PD' receives light in this connection arrangement, an electric current which is the sum of a photoelectric current flowing through the photodiode PDir and a photoelectric current flowing through the photodiode PDvis is outputted as the electric current Iin of the light receiving element PD'. Accordingly, the light receiving element PD' in this connection arrangement is set to a spectral characteristic having sensitivity in a wavelength range from visible light to infrared rays (the spectral characteristic A).

Meanwhile, in a case where the switch SW11 is off, the switch SW12 is on, the switch SW13 is on, and the switch SW14 is off, the photodiodes PDir, PDvis, and PDvissh become conductive. As a result, the photodiodes PDir, PDvis, and PDvissh are used in the light receiving element PD'. Therefore, when the light receiving element PD' receives light in this connection arrangement, an electric current obtained by subtracting a photoelectric current flowing through the photodiode PDvissh from an electric current which is the sum of a photoelectric current flowing through the photodiode PDir and a photoelectric current flowing through the photodiode PDvis is outputted as the electric current Iin of the light receiving element PD'. Accordingly, the light receiving element PD' in this connection arrangement is set to a spectral characteristic having sensitivity in a wavelength range which is obtained by reducing a short wavelength side of the wavelength range from visible light to infrared rays (hereinafter referred to as a spectral characteristic C).

Figure 10:
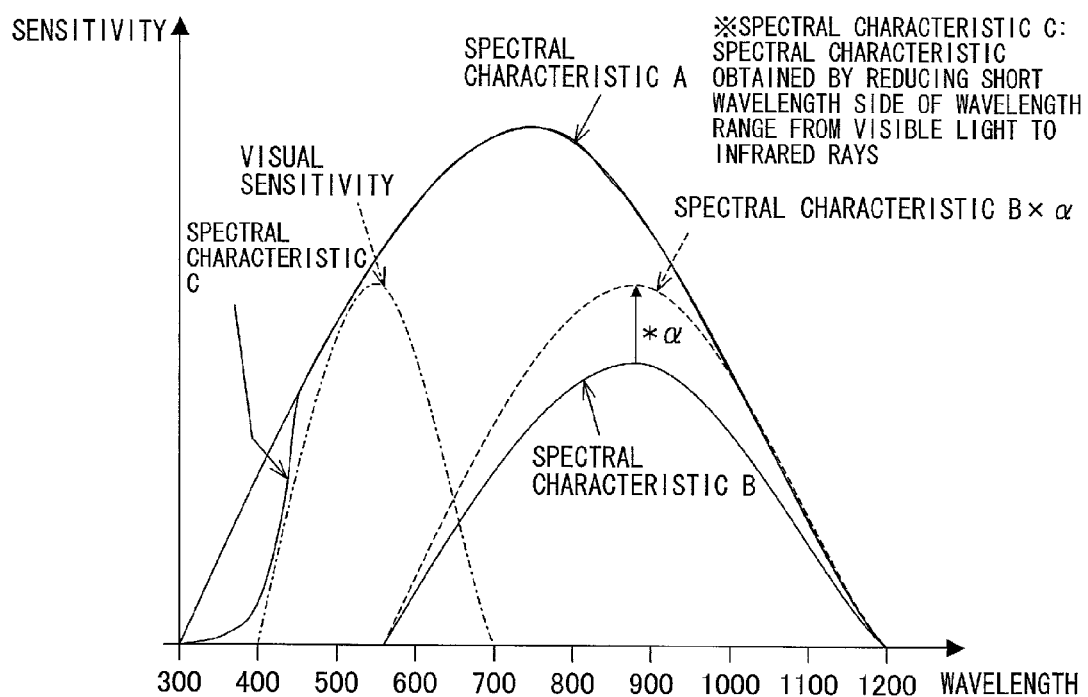
FIG. 10 is a graph illustrating spectral characteristics of the light receiving element.

FIG. 10 is a graph illustrating the spectral characteristics of the light receiving element PD'. In FIG. 10, the horizontal axis represents a wavelength (nm) and the vertical axis represents sensitivity. In the graph, the solid lines represent the spectral characteristic A, the spectral characteristic B, and the spectral characteristic C, the broken line represents the spectral characteristic B multiplied by $\alpha$, and the dashed-dotted line represents visual sensitivity.

The spectral characteristics of the light receiving element PD' include the spectral characteristic C in addition to the spectral characteristics of the light receiving element PD. The spectral characteristic C having sensitivity in a wavelength range which is obtained by reducing a short wavelength side of the wavelength range from visible light to infrared rays has a characteristic such that a range from approximately 300 nm to approximately 450 nm of the spectral characteristic A is reduced. That is, in a range from approximately 450 nm to approximately 1200 nm, the spectral characteristic C has a characteristic almost equivalent to that of the spectral characteristic A.

As described above, the light receiving element PD' includes three PN junctions, and therefore includes three photodiodes, i.e., the photodiodes PDir, PDvis, and PDvissh. The light receiving element PD' is set to any one of the spectral characteristics A through C by switching the connection arrangement with the use of the switches SW11 through SW14.

In a case where the structure of the light receiving element PD' is applied to the light receiving elements PD1 and PD2 of the sensor circuit 10, a spectral characteristic closer to visual sensitivity can be obtained, for example, by detecting light with the spectral characteristic B and the spectral characteristic C and by subtracting a photoelectric current detected with the spectral characteristic B from a photoelectric current detected with the spectral characteristic C. Further, illuminance on a short wavelength side can be detected by detecting light with the spectral characteristic A and the spectral characteristic C and by subtracting a photoelectric current detected with the spectral characteristic C from a photoelectric current detected with the spectral characteristic A.

Embodiment 2

Another embodiment of the present invention is described below with reference to the drawings. Note that a configuration in the present embodiment is identical to that of Embodiment 1 except for matters described in the present embodiment. For convenience of description, members that have identical functions to those illustrated in the drawings of Embodiment 1 are given identical reference numerals, and are not explained repeatedly. The same applies to the other Embodiments later described.

Figure 11:
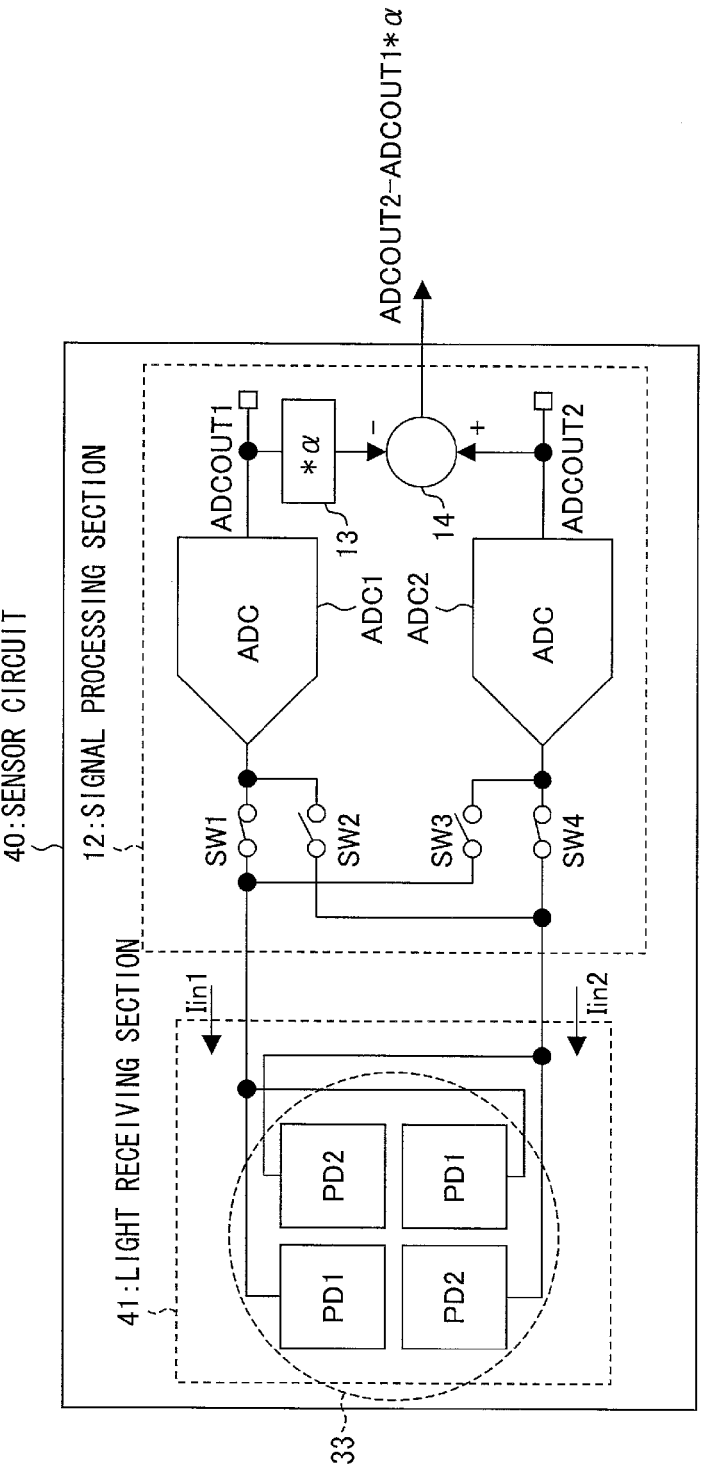
FIG. 11 is a circuit block diagram illustrating another configuration of a sensor circuit of an embodiment of the present invention.

FIG. 11 is a diagram illustrating an exemplary configuration of a sensor circuit 40 of the present embodiment. The sensor circuit 40 of the present embodiment includes a light receiving section 41 in which the light receiving elements PD1 and PD2 are disposed in a manner different from the sensor circuit 10 of the above embodiment. Specifically, as illustrated in FIG. 11, in the sensor circuit 40, the light receiving element PD1 is divided into two sections, the light receiving element PD2 is divided into two sections, and these are alternately disposed. The two sections (divided sections) of the light receiving element PD1 are connected in parallel, and the two sections (divided sections) of the light receiving element PD2 are connected in parallel.

Figure 12:
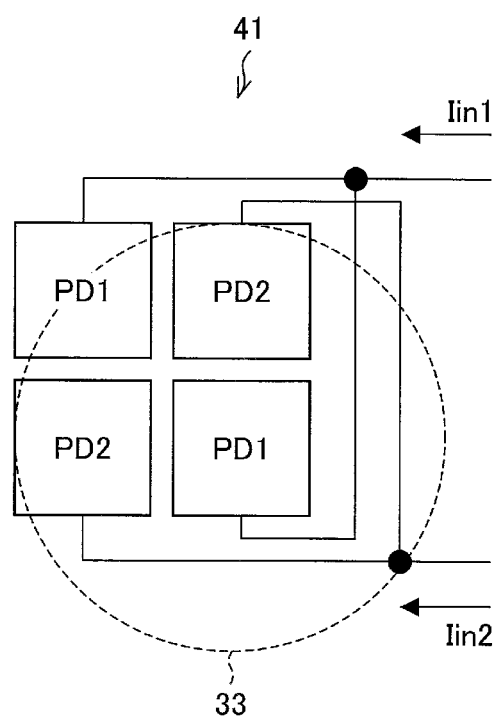
FIG. 12 is a plan view illustrating a case where a lens spot is deviated in the sensor circuit.

According to the configuration of the light receiving elements PD1 and PD2, the light receiving elements can be disposed symmetrically about a point with respect to a lens spot focused by the lens section 33 illustrated in FIG. 8. Accordingly, even in a case where the light receiving element PD1 and the light receiving element PD2 are unevenly irradiated with light due to an angle of the light, it is possible to further suppress unevenness in measurement results and a variation in sensitivity as compared with the sensor circuit 10 of the above embodiment. Consequently, it is possible to measure illuminance with higher accuracy. Moreover, even in a case where the lens spot focused by the lens section 33 is deviated as illustrated in FIG. 12, the sensor circuit 40 makes it possible to obtain results (light amounts) detected with the spectral characteristics A and B which are necessary for measurement of illuminance without causing unevenness in the results and a variation in sensitivity by switching positions of the spectral characteristics A and B.

In the sensor circuit 40, the light receiving element PD1 is equally divided into the two sections, and the light receiving element PD2 is equally divided into the two sections. Accordingly, these sections are the same in area. In a case where these sections are the same in area, an output electric current of the light receiving element PD1 and an output electric current of the light receiving element PD2 become identical to each other as a result of switching of the spectral characteristics of the light receiving elements. This can greatly contribute to suppression of unevenness in measurement results and a variation in sensitivity.

Note, however, that the divided sections of the light receiving element PD1 and the divided sections of the light receiving element PD2 are not limited to sections that are the same in area. Further, the number of divided sections is not limited to 2. However, it is desirable that the number of divided sections of the light receiving element PD1 is identical to that of the light receiving element PD2.

Embodiment 3

In a liquid crystal panel of an electronic apparatus such as a mobile phone or a digital camera, introduction of a proximity sensor, which is for detecting an object which approaches the liquid crystal panel, in addition to an illuminance sensor is increasingly becoming popular for further reduction in power consumption. In a case where a proximity sensor is provided, a backlight of a liquid crystal panel can be controlled to turn off, for example, when a face approaches the liquid crystal panel. Furthermore, in recent years, a proximity/illuminance-integrated sensor is also proposed in response to demands for a reduction in size.

In view of this, the present embodiment deals with a proximity/illuminance-integrated sensor including a sensor circuit.

Figure 13:
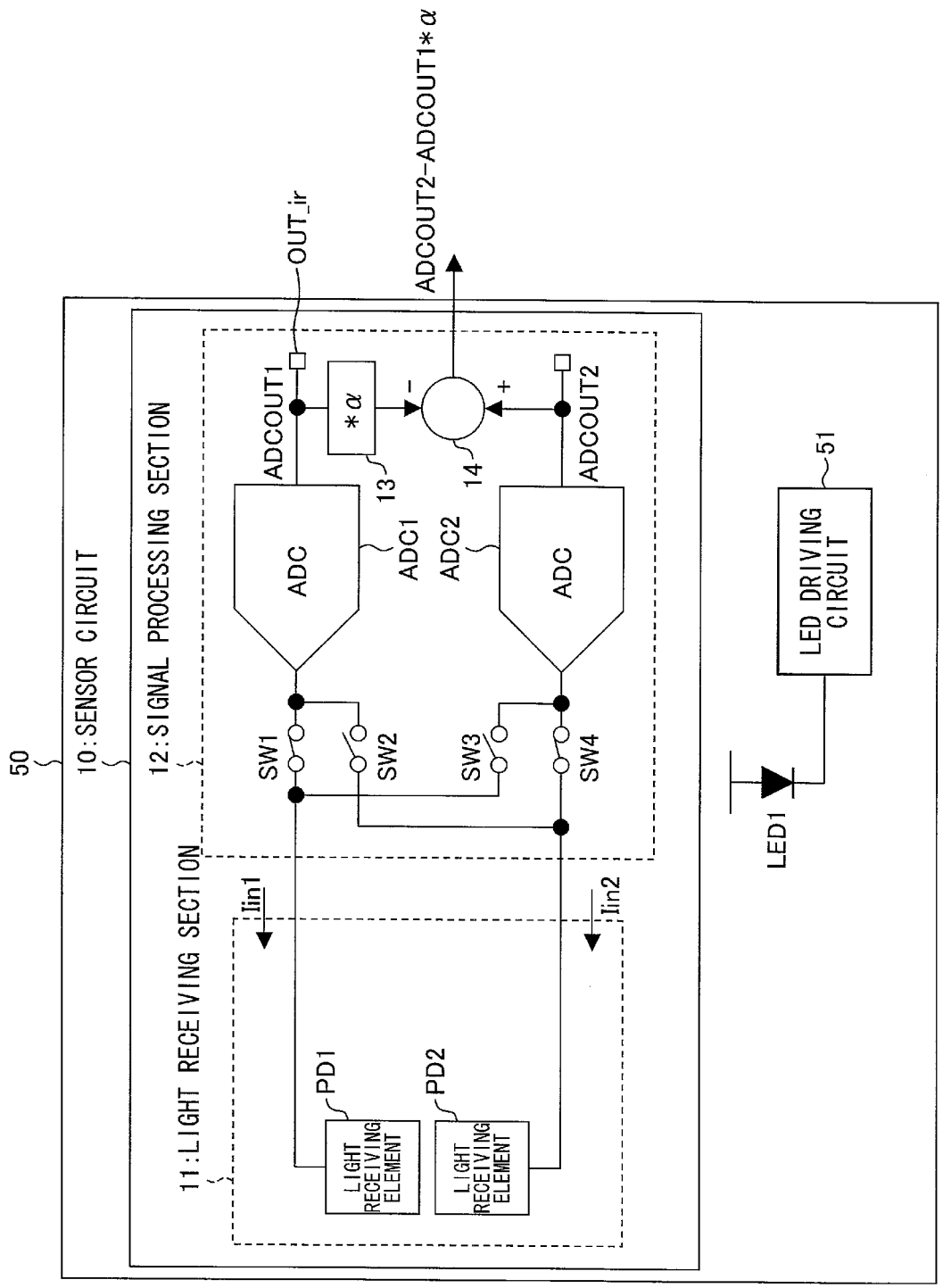
FIG. 13 is a circuit block diagram illustrating an exemplary configuration of a proximity/illuminance-integrated sensor of an embodiment of the present invention.

FIG. 13 is a diagram illustrating an exemplary configuration of a proximity/illuminance-integrated sensor 50 of the present embodiment. As illustrated in FIG. 13, the proximity/illuminance-integrated sensor (hereinafter abbreviated as "integrated sensor") 50 includes a sensor circuit 10, a light-emitting diode LED1 (light-emitting section), and an LED driving circuit 51 (driving section).

Although the sensor circuit 10 of FIG. 1 described above is used in the present embodiment, the sensor circuit 40 of FIG. 11 may be used instead of the sensor circuit 10. In a case where the light-emitting diode LED1 is not driven, the integrated sensor 50 can be applied as an illuminance sensor.

Meanwhile, in a case where the light-emitting diode LED1 is driven by the LED driving circuit 51 so as to emit infrared light, the integrated sensor 50 can be applied as a proximity sensor by causing the light receiving section 11 of the sensor circuit 10 to obtain a result detected with the spectral characteristic B (infrared rays). Specifically, a photoelectric current detected with the spectral characteristic B by the light receiving element PD1 or the light receiving element PD2 is supplied to the AD converting circuit ADC1, and an output signal ADCOUT1 of the AD converting circuit ADC1 is extracted from an output terminal OUTir. The signal ADCOUT1 outputted from the output terminal OUTir is used in a control circuit (not illustrated) of a later stage to determine whether or not an object is in proximity with the integrated sensor 50. The integrated sensor 50 in which a proximity sensor and an illuminance sensor are integrated is thus achieved.

Figure 14:
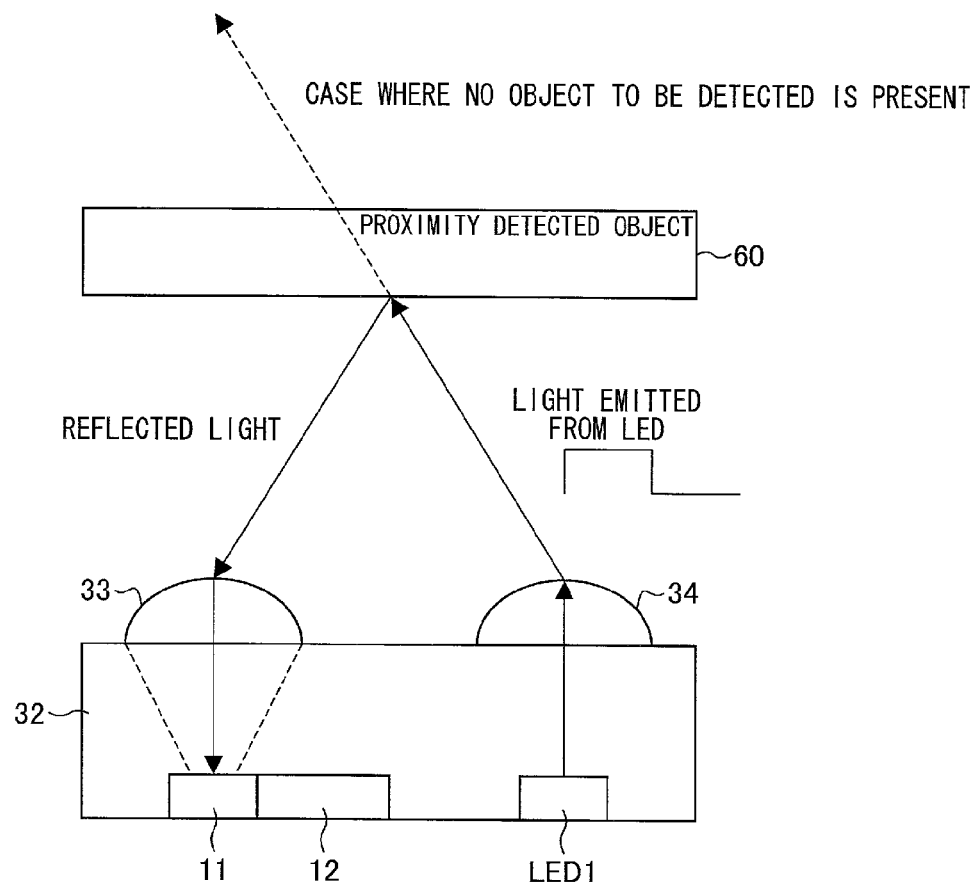
FIG. 14 is a diagram illustrating a cross section structure of the proximity/illuminance-integrated sensor.

FIG. 14 is a diagram illustrating a cross section structure of the integrated sensor 50. In the integrated sensor 50, the light receiving section 11, the signal processing section 12, and the light-emitting diode LED1 are sealed with a sealing resin 32, and lens sections 33 and 34 are provided above the light receiving section 11 and the light-emitting diode LED 1, respectively.

In a case where the integrated sensor 50 operates as a proximity sensor, light emitted from the light-emitting diode LED1 is supplied to an outside via the lens section 34. In a case where no object to be detected is present, the light continues to travel. Meanwhile, in a case where an object to be detected (e.g., a proximity detected object 60) is present, the light is reflected by the proximity detected object 60, passes through the lens section 33, and is received by the light receiving section 11. The lens section 33 allows an improvement in proximity characteristics and directive characteristics. Further, the lens section 33 allows the sensor circuit 10 to obtain results (light amounts) detected with the spectral characteristics A and B without causing unevenness in the results and a variation in sensitivity even in a case where a lens spot is deviated.

Figure 15:
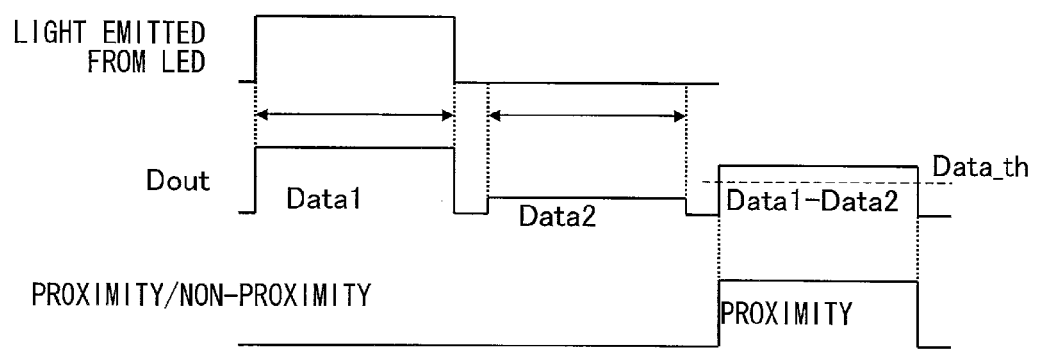
FIG. 15 is an operation waveform obtained in a case where the proximity/illuminance-integrated sensor operates as a proximity sensor and detects "proximity".
Figure 16:
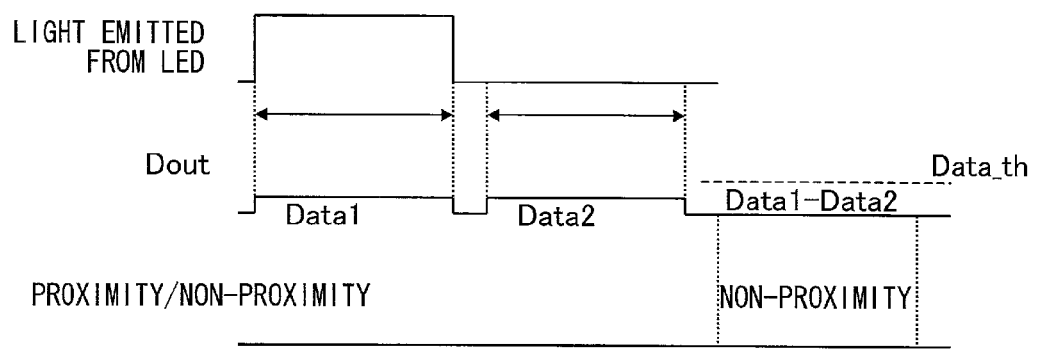
FIG. 16 is an operation waveform obtained in a case where the proximity/illuminance-integrated sensor operates as a proximity sensor and detects "non-proximity".

FIG. 15 and FIG. 16 illustrate an operation waveform obtained in a case where the integrated sensor operates as a proximity sensor. FIG. 15 is an operation waveform obtained in a case where "proximity" is detected. FIG. 16 is an operation waveform obtained in a case where "proximity" is not detected, i.e., a case where "non-proximity" is detected.

A difference between data (Data1) during a period in which the light-emitting diode LED1 is driven and data (Data2) during a period in which the light-emitting diode LED1 is not driven is referred to as proximity data (Data1−Data2). Each of the data is outputted, as a measurement signal ADCOUT1, from the output terminal OUTir, and the proximity data is calculated in a control circuit of a later stage.

In a case where an object to be detected is present, light reflected from the object to be detected is strong, and therefore a photoelectric current of a light receiving element becomes large. As a result, a value of the electric current exceeds a threshold value Data_th, and "proximity" is detected (see FIG. 15). Meanwhile, in a case where no object to be detected is present, light reflected from the object to be detected is weak, and therefore a photoelectric current of the light receiving element is small. As a result, a value of the electric current does not exceed the threshold value Data_th, and "non-proximity" is detected (see FIG. 16).

Further, since a value measured by the proximity sensor is inversely proportional to the square of a detection distance. Accordingly, by calculating the detection distance from the measured value, the integrated sensor 50 can be applied as a distance measuring sensor for detecting a distance.

Figure 17:
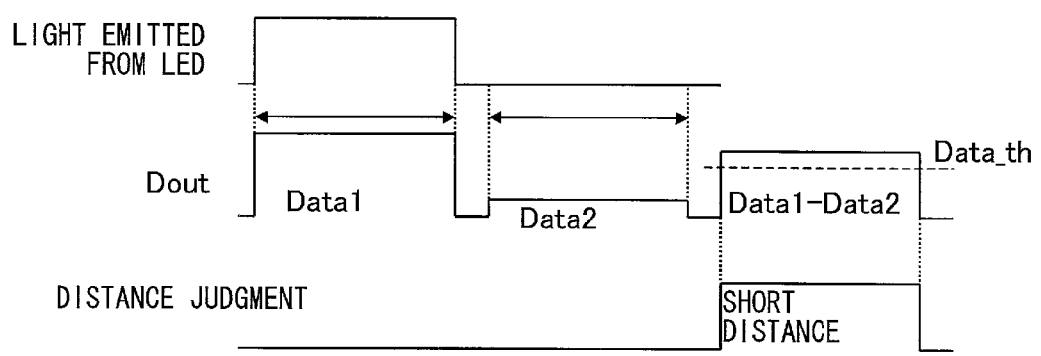
FIG. 17 is an operation waveform obtained in a case where the proximity/illuminance-integrated sensor operates as a distance measuring sensor and detects "short distance".
Figure 18:
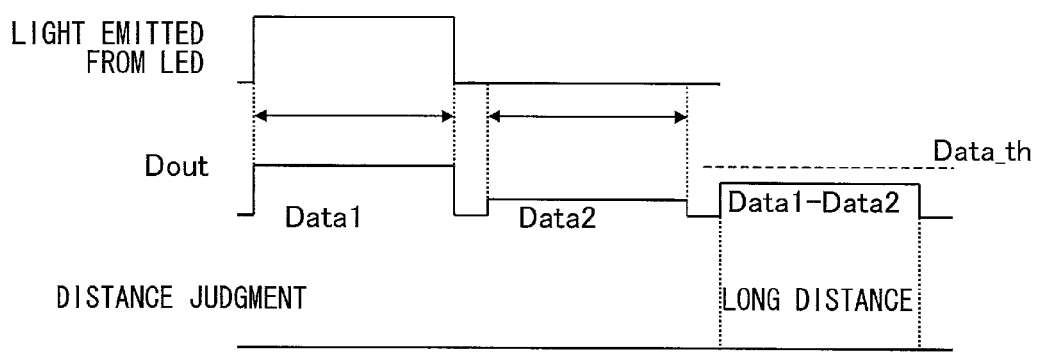
FIG. 18 is an operation waveform obtained in a case where the proximity/illuminance-integrated sensor operates as a distance measuring sensor and detects "long distance".

FIG. 17 and FIG. 18 illustrate an operation waveform obtained in a case where the integrated sensor 50 operates as a distance measuring sensor. FIG. 17 is an operation waveform obtained in a case where "short distance" is detected. FIG. 18 is an o peration waveform obtained in a case where "long distance" is detected.

A way in which the distance measuring sensor makes judgment is basically identical to that of the proximity sensor. In a case where an object to be detected is in proximity to the integrated sensor 50, light reflected from the object to be detected is strong, and therefore a photoelectric current of a light receiving element becomes large. As a result, a value of the electric current exceeds the threshold value Data_th, and "short distance" is detected (see FIG. 17). Meanwhile, in a case where an object to be detected is distant from the integrated sensor 50, light reflected from the object to be detected is weak, and therefore a photoelectric current of a light receiving element is small. As a result, a value of the electric current does not exceed the threshold value Data_th, and "long distance" is detected (see FIG. 18).

Embodiment 4

The present embodiment describes a liquid crystal display device including a sensor circuit.

Figure 19:
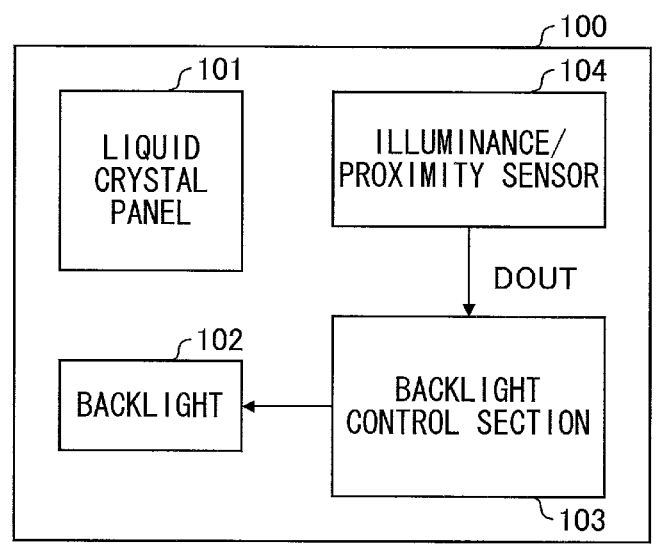
FIG. 19 is a block diagram illustrating an exemplary configuration of a liquid crystal display device of an embodiment of the present invention.
Figure 20:
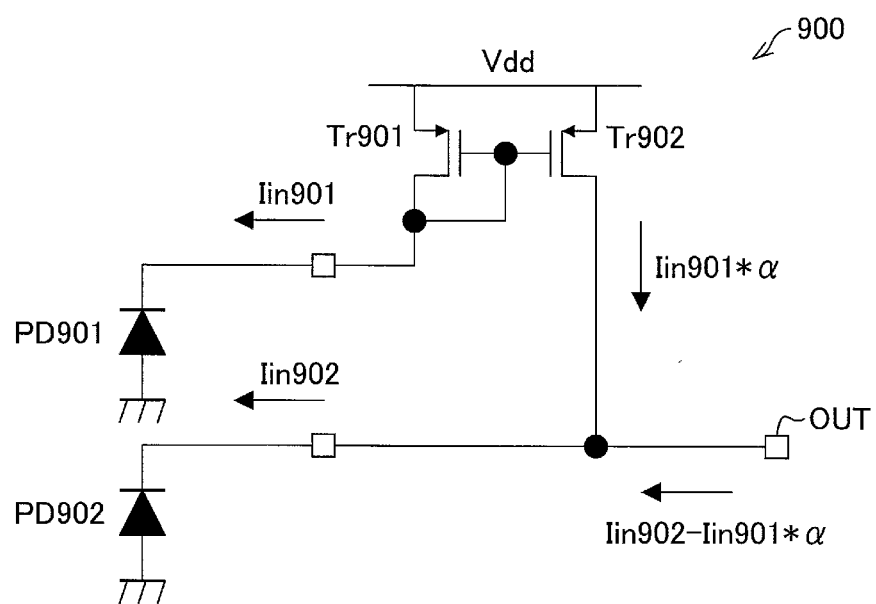
FIG. 20 is a circuit diagram illustrating an outline configuration of a conventional optical sensor circuit.
Figure 21:
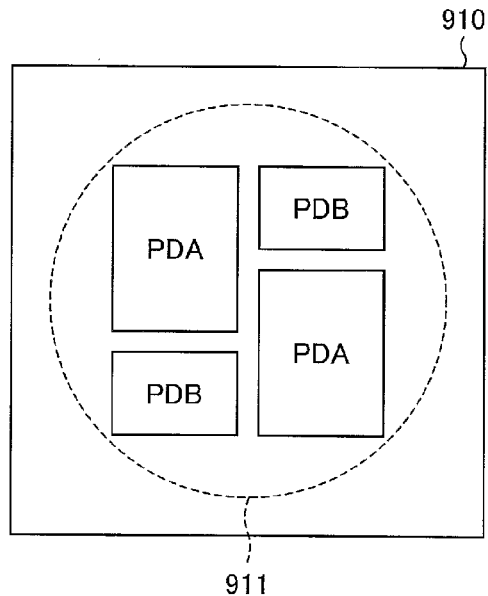
FIG. 21 is a plan view illustrating an outline configuration of a light receiving element provided in a conventional illumination sensor.
Figure 22:
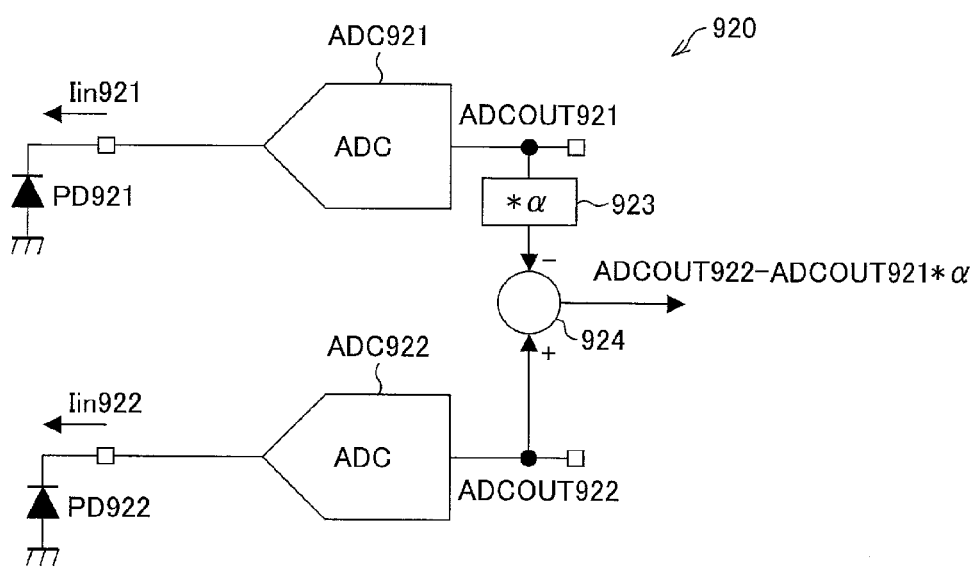
FIG. 22 is a circuit diagram illustrating an outline configuration of a conventional digital-type illuminance sensor.
Figure 23:
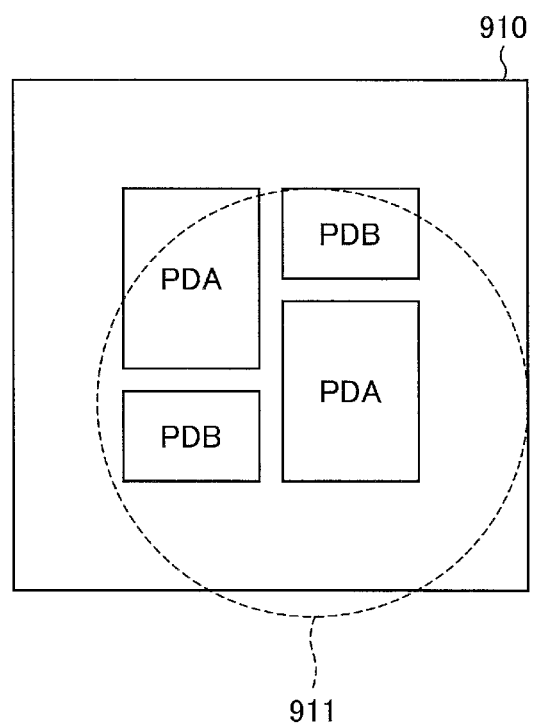
FIG. 23 is a plan view illustrating a case where a lens spot is deviated in a conventional illumination sensor.

FIG. 19 is a diagram illustrating an exemplary configuration of a liquid crystal display device 100 of the present embodiment. As illustrated in FIG. 19, the liquid crystal display device 100 includes a liquid crystal panel 101 for displaying an image, a backlight 102 for illuminating the liquid crystal panel 101, a backlight control section 103 for controlling luminance of the backlight 102, and an illuminance/proximity sensor 104. The illuminance/proximity sensor 104 may be any one of the sensor circuit 10 of FIG. 1, the sensor circuit 40 of FIG. 11, and the integrated sensor 50 of FIG. 13.

The illuminance/proximity sensor 104 supplies a measurement result DOUT to the backlight control section 103. In a case where the illuminance/proximity sensor 104 operates as an illuminance sensor, the measurement result DOUT corresponds to the measurement signal (ADCOUT2−ADCOUT1×α). Meanwhile, in a case where the illuminance/proximity sensor 104 operates as a proximity sensor, the measurement result DOUT corresponds to the measurement signal ADCOUT1. The backlight control section 103 can thus control (adjust) luminance of the backlight 102 in accordance with surrounding brightness or presence/absence of a proximity object.

The liquid crystal display device 100 is applicable, for example, to a display device including a liquid crystal panel which display device is provided in an electronic apparatus such as a mobile phone or a digital still camera. A large effect can be produced especially in a portable electronic apparatus for which a reduction in power consumption is required.

The sensor circuit of the present invention is preferably arranged such that the light receiving elements include a first light receiving element and a second light receiving element, each of the first light receiving element and the second light receiving element is set to one of a first spectral characteristic and a second spectral characteristic that are different from each other, the illuminance is measured during a first measuring time and a second measuring time that are successive, in the first measuring time, the first light receiving element is set to the first spectral characteristic, and the second light receiving element is set to the second spectral characteristic, and in the second measuring time, the first light receiving element is set to the second spectral characteristic, and the second light receiving element is set to the first spectral characteristic.

According to the arrangement, it is possible to obtain a light amount detected with the first spectral characteristic from the first light receiving element during the first measuring time and from the second light receiving element during the second measuring time. Further it is possible to obtain a light amount detected with the second spectral characteristic from the second light receiving element during the first measuring time and from the first light receiving element during the second measuring time. That is, this is equivalent to a case where detection is carried out while interchanging a position of a light receiving element having the first spectral characteristic and a position of a light receiving element having the second spectral characteristic between the first measuring time the second measuring time.

Accordingly, it is possible to obtain a result detected with the first spectral characteristic and a result detected with the second spectral characteristic without causing unevenness in the results and a variation in sensitivity even in a case where the first light receiving element and the second light receiving element are unevenly irradiated with light. Consequently, it is possible to accurately measure illuminance.

The sensor circuit of the present invention is preferably arranged such that the first spectral characteristic has sensitivity in a wavelength range of infrared rays, and the second spectral characteristic has sensitivity in a wavelength range from visible light to infrared rays.

According to the arrangement, a spectral characteristic close to visual sensitivity can be achieved by subtracting a result detected with the first spectral characteristic from a result detected with the second spectral characteristic. As such, the sensor circuit can be applied as an illuminance sensor for measuring illuminance of visible light.

The sensor circuit of the present invention is preferably arranged such that the illuminance is measured during a period of time including a plurality of successive pairs of the first measuring time and the second measuring time that are successive.

The sensor circuit of the present invention is preferably arranged such that the first light receiving element is divided into two or more sections all of which are connected in parallel, the second light receiving element is divided into a same number of sections as the first light receiving element, all of which sections are connected in parallel, and the sections of the first light receiving element and the sections of the second light receiving element are alternately disposed.

According to the arrangement, it is possible to dispose the first light receiving element and the second light receiving element evenly and symmetrically with respect to a point in a light receiving region. Consequently, it is possible to obtain a result detected with the first spectral characteristic and a result detected with the second spectral characteristic without causing unevenness in the results and a variation in sensitivity.

The sensor circuit of the present invention is preferably arranged such that the sections of the first light receiving element and the sections of the second light receiving element are same in area.

The sensor circuit of the present invention is preferably arranged to further include: a light-emitting section; and a driving section for driving the light-emitting section.

According to the arrangement, the sensor circuit can function not only as an illuminance sensor but also as a proximity sensor.

The sensor circuit of the present invention is preferably arranged to further include: a sealing resin for sealing the first light receiving element and the second light receiving element; and a lens section provided on a surface of the sealing resin so as to be located above the first light receiving element and the second light receiving element.

The sensor circuit of the present invention is preferably arranged to further include: a first converting section for converting a light amount detected with the first spectral characteristic into a digital value; and a second converting section for converting a light amount detected with the second spectral characteristic into a digital value, the first converting section and the second converting section each being an integral analog/digital converting circuit which outputs a digital value obtained by integrating a light amount detected during the first measuring time and a digital value obtained by integrating a light amount detected during the second measuring time.

According to the arrangement, since each of the first converting section and the second converting section is an integral AD converting circuit, a process of converting a light amount detected with a predetermined spectral characteristic into a digital value can be easily carried out on the basis of an inputted electric current even in a case where light receiving elements respectively connected to the first converting section and the second converting section vary between the first measuring time and the second measuring time.

The sensor circuit of the present invention is preferably arranged such that the analog/digital converting circuit includes: a charging circuit that is charged with an input electric current; a comparing circuit that compares an output voltage of the charging circuit with a reference voltage; a discharging circuit that discharges the charging circuit in a case where the output voltage of the charging circuit exceeds the reference voltage as a result of the comparison of the comparing circuit; and a control circuit that counts, on a basis of the result of the comparison of the comparing circuit, the number of times the discharging circuit discharges the charging circuit during the first measuring time and the second measuring time and outputs a digital value corresponding to the number of times.

The present invention is not limited to the description of the embodiments above, but may be altered by a skilled person within the scope of the claims. An embodiment based on a proper combination of technical means disclosed in different embodiments is encompassed in the technical scope of the present invention.

INDUSTRIAL APPLICABILITY

The present invention is suitably applicable not only to the field related to an illuminance sensor, a proximity sensor, and a distance measuring sensor, but also to the field related to a method for controlling these sensors and a method for manufacturing these sensors. Further, the present invention is widely applicable to fields of electronic apparatuses, such as a mobile phone and a digital camera, including these sensors.

REFERENCE SIGNS LIST 10, 40: Sensor circuit
11, 41: Light receiving section
12: Signal processing section
13: Multiplying section
14: Subtracting section
21: Charging circuit
22: Comparing circuit
23: Control circuit
24: Discharging circuit
32: Sealing resin
33: Lens section
50: Proximity/illuminance-integrated sensor (sensor circuit)
51: LED driving circuit (driving section)
100: Liquid crystal display device
101: Liquid crystal panel
102: Backlight
103: Backlight control section
104: Illuminance/proximity sensor (sensor circuit)
PD1: Light receiving element (first light receiving element)
PD2: Light receiving element (second light receiving element)
PDir: Photodiode
PDvis: Photodiode
PDvissh: Photodiode
ADC1: Analog/digital converting circuit (first converting section)
ADC2: Analog/digital converting circuit (second converting section)
LED 1: Light-emitting diode (light-emitting section)
SW1-SW4, SW11-SW14, SW21, SW22: Switch

The invention claimed is:

1. A sensor circuit for measuring illuminance on a basis of a plurality of light amounts detected with spectral characteristics that are different from each other, comprising n (n is an integer of 2 or more) light receiving elements;
the light receiving elements each being set to a single spectral characteristic selected from n spectral characteristics that are different from each other, and
the single spectral characteristic set in each of the light receiving elements being sequentially switched among the n spectral characteristics so that the light receiving elements are set to different spectral characteristics during measurement of the illuminance.

2. The sensor circuit according to claim 1, wherein:
the light receiving elements include a first light receiving element and a second light receiving element,
each of the first light receiving element and the second light receiving element is set to one of a first spectral characteristic and a second spectral characteristic that are different from each other,
the illuminance is measured during a first measuring time and a second measuring time that are successive,
in the first measuring time, the first light receiving element is set to the first spectral characteristic, and the second light receiving element is set to the second spectral characteristic, and in the second measuring time, the first light receiving element is set to the second spectral characteristic, and the second light receiving element is set to the first spectral characteristic.

3. The sensor circuit according to claim 2, wherein:
the first spectral characteristic has sensitivity in a wavelength range of infrared rays, and
the second spectral characteristic has sensitivity in a wavelength range from visible light to infrared rays.

4. The sensor circuit according to claim 2, wherein the illuminance is measured during a period of time including a plurality of successive pairs of the first measuring time and the second measuring time that are successive.

5. The sensor circuit according to claim 2, wherein:
the first light receiving element is divided into two or more sections all of which are connected in parallel,
the second light receiving element is divided into a same number of sections as the first light receiving element, all of which sections are connected in parallel, and
the sections of the first light receiving element and the sections of the second light receiving element are alternately disposed.

6. The sensor circuit according to claim 5, wherein the sections of the first light receiving element and the sections of the second light receiving element are same in area.

7. The sensor circuit according to claim 2, further comprising:
a light-emitting section; and
a driving section for driving the light-emitting section.

8. The sensor circuit according to claim 2, further comprising:
a sealing resin for sealing the first light receiving element and the second light receiving element; and
a lens section provided on a surface of the sealing resin so as to be located above the first light receiving element and the second light receiving element.

9. The sensor circuit according to claim 2, further comprising:
a first converting section for converting a light amount detected with the first spectral characteristic into a digital value; and
a second converting section for converting a light amount detected with the second spectral characteristic into a digital value,
the first converting section and the second converting section each being an integral analog/digital converting circuit which outputs a digital value obtained by integrating a light amount detected during the first measuring time and a digital value obtained by integrating a light amount detected during the second measuring time.

10. The sensor circuit according to claim 9, wherein the analog/digital converting circuit includes:
a charging circuit that is charged with an input electric current;
a comparing circuit that compares an output voltage of the charging circuit with a reference voltage;
a discharging circuit that discharges the charging circuit in a case where the output voltage of the charging circuit exceeds the reference voltage as a result of the comparison of the comparing circuit; and
a control circuit that counts, on a basis of the result of the comparison of the comparing circuit, the number of times the discharging circuit discharges the charging circuit during the first measuring time and the second measuring time and outputs a digital value corresponding to the number of times.

11. An electronic apparatus comprising:
a liquid crystal panel;
a backlight for illuminating the liquid crystal panel;
a backlight control section for controlling luminance of the backlight; and
a sensor circuit,
the backlight control section controlling the luminance of the backlight in accordance with an output signal of the sensor circuit,
the sensor circuit measuring illuminance on a basis of a plurality of light amounts detected with spectral characteristics that are different from each other,
the sensor circuit including n (n is an integer of 2 or more) light receiving elements;
the light receiving elements each being set to a single spectral characteristic selected from n spectral characteristics that are different from each other, and
the single spectral characteristic set in each of the light receiving elements being sequentially switched among the n spectral characteristics so that the light receiving elements are set to different spectral characteristics during measurement of the illuminance.

* * * * *